United States Patent [19]

Hablani

[11] Patent Number: 5,400,033
[45] Date of Patent: Mar. 21, 1995

[54] TRACKING SYSTEM FOR TRACKING TARGETS WITH A SPACECRAFT

[75] Inventor: Hari B. Hablani, Westminster, Calif.

[73] Assignee: Rockwell International Corporation, Seal Beach, Calif.

[21] Appl. No.: 192,877

[22] Filed: Feb. 7, 1994

[51] Int. Cl.⁶ ............................................. G01S 13/72
[52] U.S. Cl. ....................................... 342/95; 342/96; 342/77; 342/81; 342/357; 342/76; 342/62; 342/97
[58] Field of Search .................. 342/95, 52, 58, 62, 342/75, 77, 81, 96, 97, 352, 357, 354, 355, 358, 417, 420, 421, 76

[56] References Cited

U.S. PATENT DOCUMENTS

| | | | |
|---|---|---|---|
| 5,325,098 | 6/1994 | Blair et al. | 342/95 |
| 5,337,243 | 8/1994 | Shibata et al. | 364/449 |
| 5,341,142 | 8/1994 | Reis et al. | 342/64 |
| 5,341,143 | 8/1994 | Reis et al. | 342/64 |
| 5,351,056 | 9/1994 | Sawyer | 342/195 |

OTHER PUBLICATIONS

"Integral Pulse Frequency On–Off Control" by R. Farrenkopf, A. Sabroff, & P. Wheeler (Progress in Astronautics & Aeronautics, vol. 13, 1964).

"Design of a Payload Pointing Control System for Tracking Moving Objects", by Hari B. Hablani (J. Guidance, vol. 12, No. 3, May–Jun. 1989).

"Satellite Attitude Control by Reaction Jet Frequency Modulation" by J. Bernussou (J. Spacecraft, vol. 10, No. 1, 1972).

"Target Acquisition, Tracking, Spacecraft Attitude Control, and Vibration Suppression With IPFM Reaction Jet Controllers", H. Hablani (Aug. 1992 pp. 1118–1137).

"Basic Relations for Control of Flexible Vehicles", W. B. Gevarter (AIAA Journal, vol. 8, No. 4, Apr. 1970, pp. 666–672).

"Attitude Stabilization of Flexible Spacecraft During Stationkeeping Maneuvers" by B. Wie and C. Plescia (J. Guidance, vol. 7, No. 4, 1983, pp. 430–436).

"The Effects of Structural Stability on the Nonlinear Attitude Control of Spacecraft" by T. M. Abdel-Rahman (UTIAS Report No. 222, CN ISSN 0082-5255 Dec. 1977).

Primary Examiner—John B. Sotomayor
Attorney, Agent, or Firm—Lawrence N. Ginsberg; Charles T. Silberberg

[57] ABSTRACT

This invention comprises the use of integral pulse frequency modulation (IPFM) reaction jet controllers for multi-axis precision tracking of moving objects with flexible spacecraft, and vibration suppression. Two sets of position, rate and accelertion command profiles for multi-axis tracking are disclosed: one for a payload initially facing the zenith and the commands based on a pitch-roll sequence; the other for a payload facing the nadir and the commands based on a roll-pitch sequence. The procedure for designing an IPFM controller for tracking a given, inertial acceleration command profile is disclosed. Important elastic modes of a spacecraft are identified according to their spontaneous attitude and rate response to the minimum impulse bit of the thrusters. The stability of the control-structure interaction is shown to be governed by the ratio of the moments of inertia of the flexible to the rigid portions of the spacecraft. If this ratio is below unity for any axis, the spacecraft is stable; otherwise, not. The stability inequality for symmetric elastic modes, when they induce attitude motion because of a moment arm from the vehicle mass center, is formulated.

10 Claims, 15 Drawing Sheets

Single-axis integral pulse frequency modulation reaction jet controller for flexible spacecraft: Position and rate commands derived from instantaneous target line-of-sight

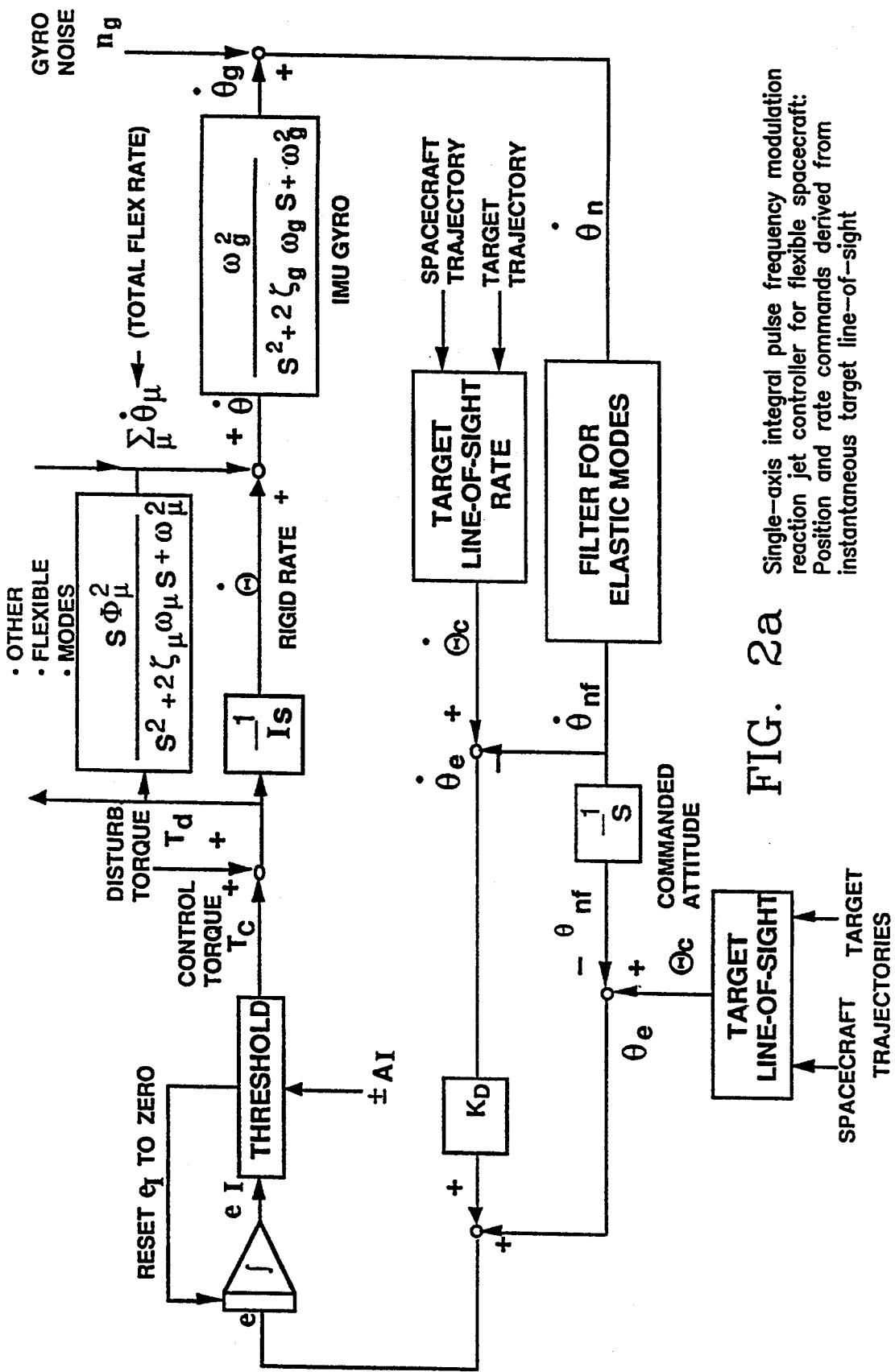
FIG. 2a  Single-axis integral pulse frequency modulation reaction jet controller for flexible spacecraft: Position and rate commands derived from instantaneous target line-of-sight

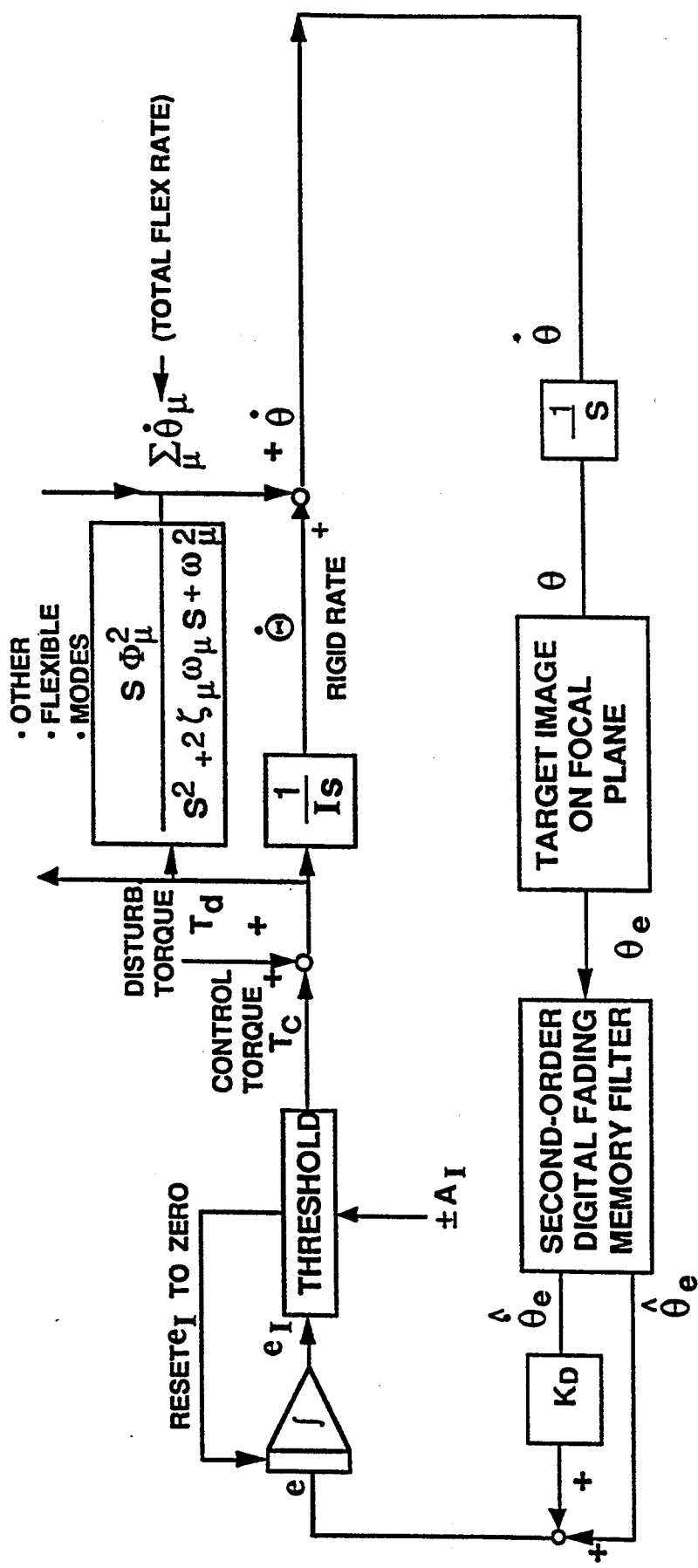
FIG. 2b  Single-axis integral pulse frequency modulation reaction jet controller for target tracking: Tracking errors derived from target image on the focal plane

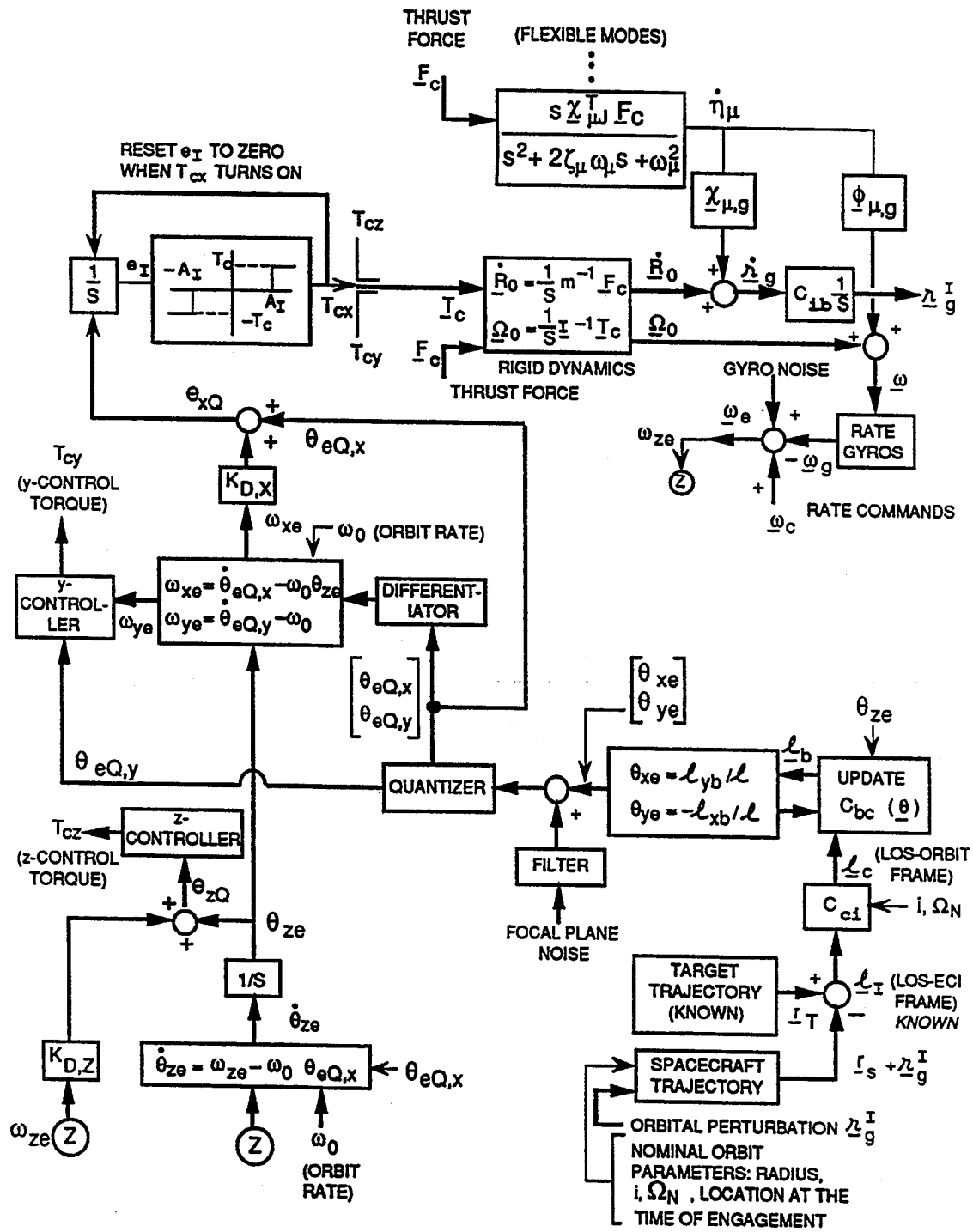
FIG. 3    IPFM controller for flexible spacecraft: multi-axis tracking

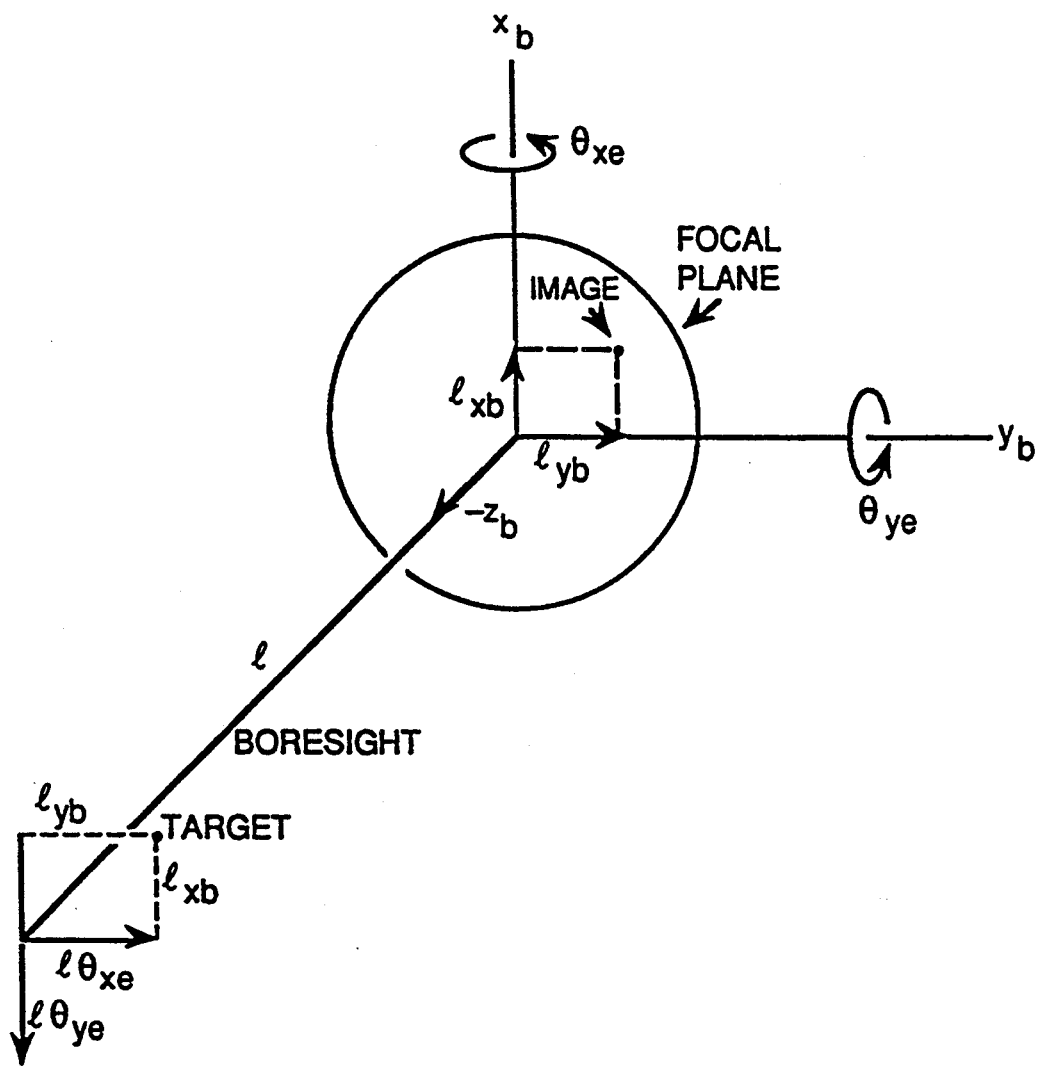
FIG. 4  Determination of small attitude errors using focal plane image of target

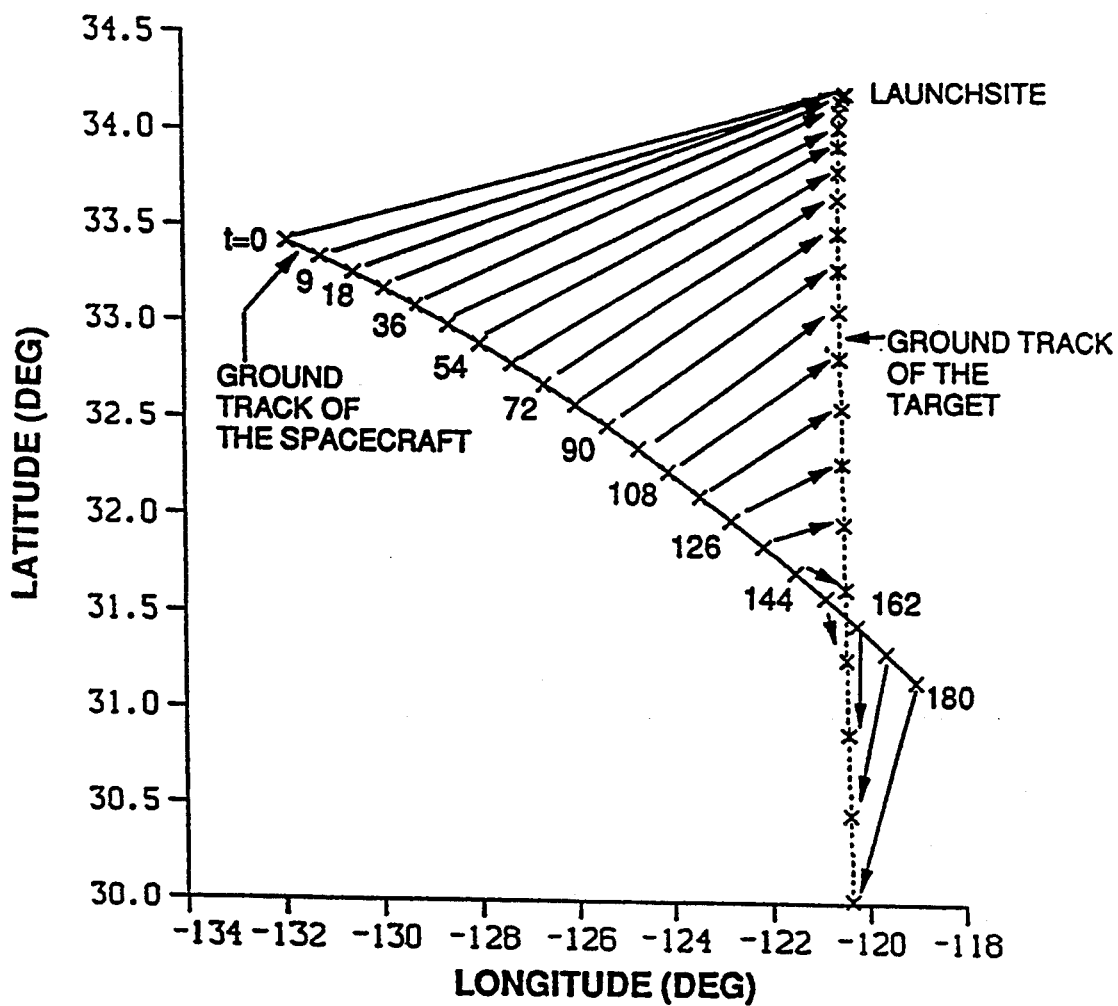
FIG. 5  Ground tracks of a spacecraft and a target on the rotating earth Intrack ($\theta_{yc}$) and crosstrack ($\theta_{xc}$) Euler angle commands for tracking a moving object; spacecraft at 370 km altitude

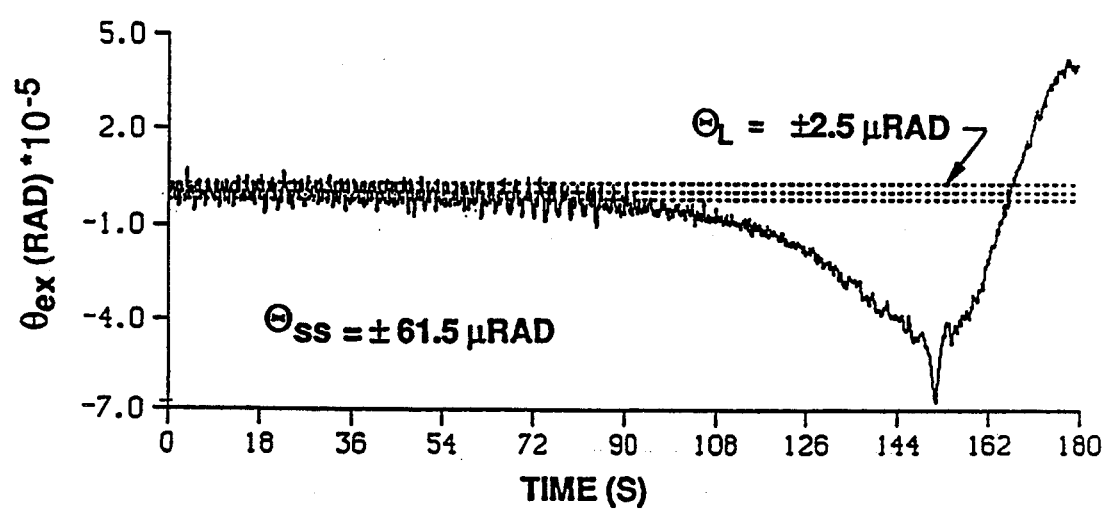
FIG. 7  Roll error during tracking a moving object with IPFM controllers

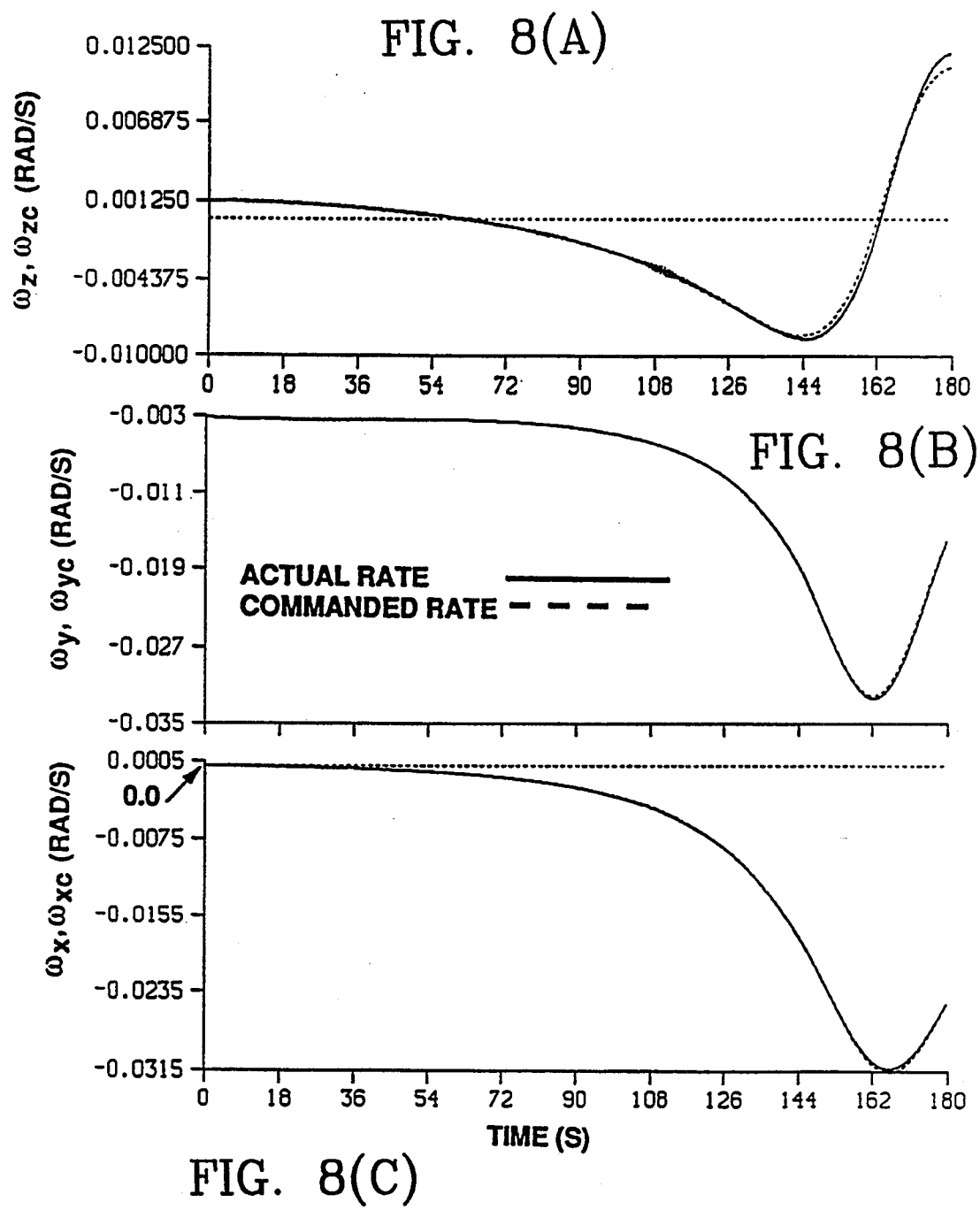
Multi-axis tracking of a moving object: commanded inertial rates $\omega_{xc}, \omega_{yc}, \omega_{zc}$ and actual rates $\omega_x, \omega_y, \omega_z$, in spacecraft frame

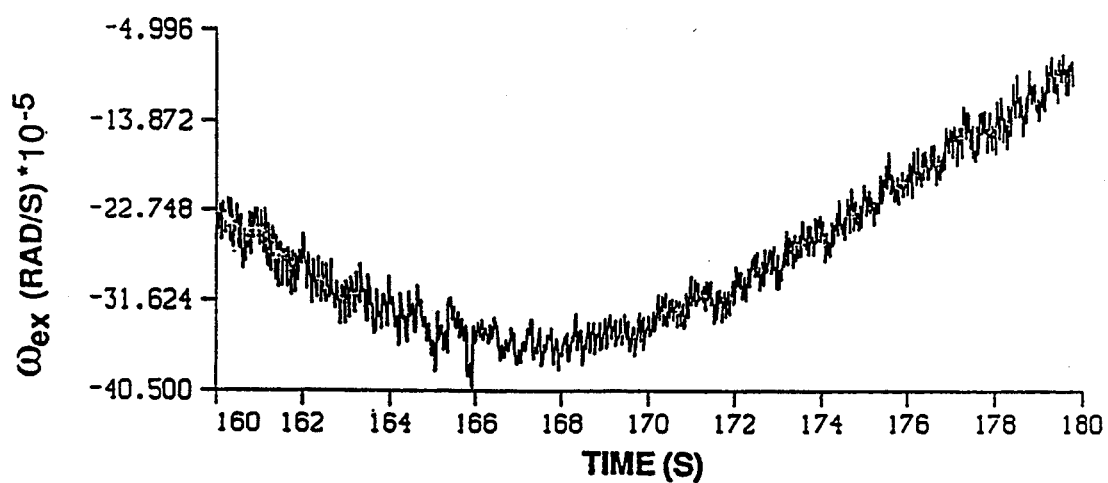
FIG. 9  Roll rate errors, on magnified scales: 160≤t≤180 s

Roll and yaw control torque history for tracking

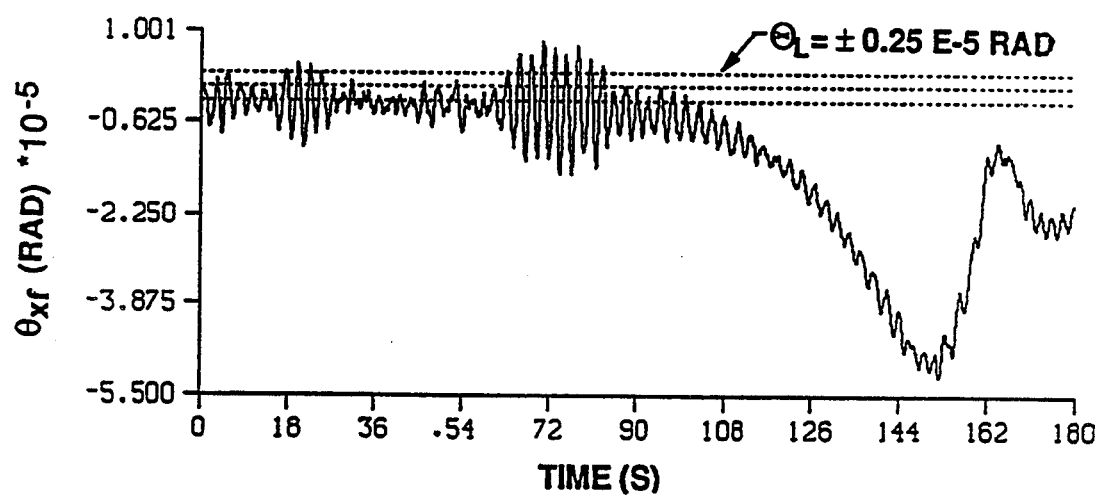
FIG. 11  Roll jitter caused by ten flexible modes y-axis control and vibration suppression during stationkeeping

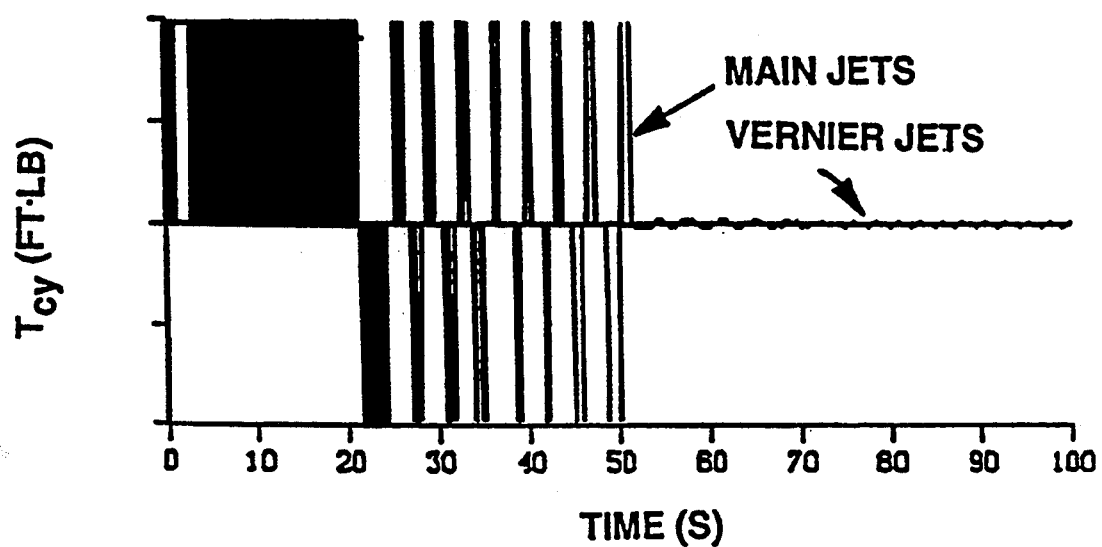
FIG. 13  Thruster firings for y-control during stationkeeping and afterwards

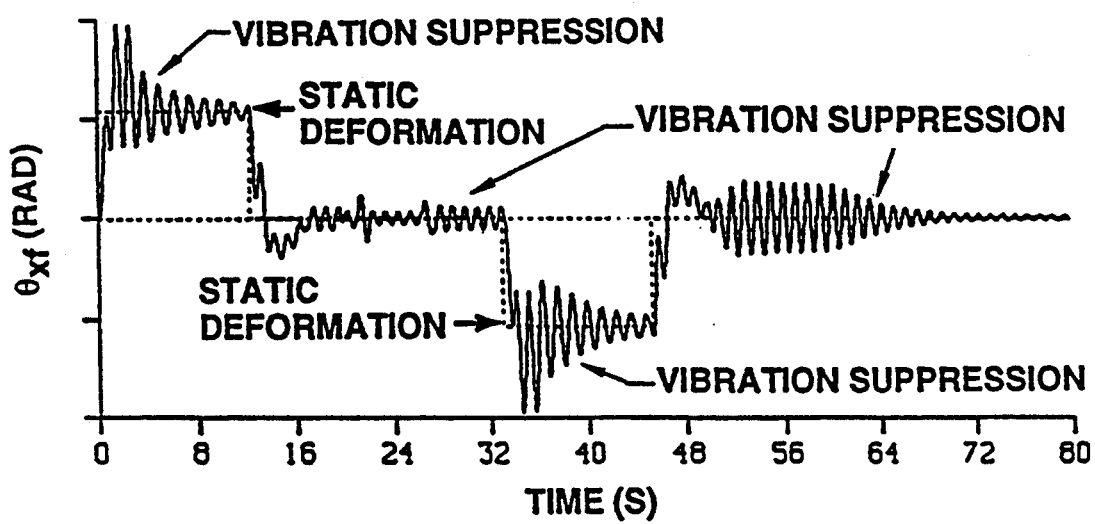
FIG. 14  Excitation and suppression of elastic mode 4(0.97 Hz) during 90° slew

TRACKING SYSTEM FOR TRACKING TARGETS WITH A SPACECRAFT

BACKGROUND OF THE INVENTION

1. Field of the Invention

This invention relates to precision tracking of targets (aeroplanes, missiles, launch vehicles, launchsites, landmarks, etc.) with a spacecraft, and more particularly to the use of integral pulse frequency modulation (IPFM) reaction jets for tracking the target with small tracking errors. Additionally, this invention is related to stabilizing the interaction of control jets with flexible portions of the spacecraft and to suppressing vibration to minimize jitter.

2. Description of the Related Art

Farrenkopf et al. (see Farrenkopf, R. L., Sabroff, A. E., and Wheeler, P. C., "Integral Pulse Frequency On-Off Control," *Guidance and Control II*, Edited by R. C. Langford and C. J. Mundo, Vol. 13, Progress in Astronautics and Aeronautics, Academic Press, New York, 1964, pp. 185-216) presented a complete procedure for designing a single-axis IPFM controller, and compared its performance with a saturating proportional-plus-derivative controller and a relay controller with a deadband and hysteresis. Abdel-Rahman (see Abdel-Rahman, T.M.M., *The Effects of Structural Flexibility on the Nonlinear Attitude Control of Spacecraft*, Institute for Aerospace Studies, University of Toronto, UTIAS Report No. 222, December 1977) compared it further with a dual time constant pseudorate controller. The unique characteristics and benefits of an IPFM controller are: It activates a thruster pulse of constant width whenever the integral of a linear combination of position and rate errors exceeds a certain threshold; the frequency of the jet firing is thereby modulated, keeping the pulsewidth constant. Farrenkopf, et al. (see Farrenkopf, Sabroff, and Wheeler, above) conclude that because of integration of the errors, the effect of sensor noise is considerably mitigated and the attitude control is much smoother than that by a pseudorate controller. This is true also because of availability of the rate error. Owing to these features, the IPFM controller is not as debilitated by structural flexibility as a pseudorate controller is, even when the natural damping of the structure is low ($\zeta \approx 0.0025$) and the sensor time lag large (see Abdel-Rahman, above). As will be disclosed below, IPFM controllers are therefore utilized herein for target tracking, requiring large angle multi-axis attitude motions, and for spacecraft attitude control under disturbance torques.

Thrusters are particularly prone to exciting flexible modes of a spacecraft. Therefore, it is imperative to examine if flexibility degrades the controller performance, induces instability, or under some favorable circumstances the controller suppresses the vibrations. The interaction between nonlinear reaction jet controllers and structures has been analyzed in the past using describing function and Liapunov techniques. These analyses tend to be rather sophisticated, however. Moreover, symmetric elastic modes usually do not interact with spacecraft attitude, but when they do, owing to their moment arm from the vehicle mass center, thrusters must be located carefully because their translational force is not of the same genre as the angle measured by an IMU gyro. Gevarter (see Gevarter, W. B., "Basic Relations for Control of Flexible Vehicles," *AIAA Journal*, Vol. 8, No. 4, 1970, pp. 666-672) furnished corresponding linear stability conditions.

SUMMARY OF THE INVENTION

The present invention is a tracking system for tracking a target with a spacecraft. The tracking system comprises at least one integral pulse frequency modulation reaction jet control system for tracking a target with small tracking errors. The reaction jet control system preferably comprises means for utilizing target trajectory ($r_T$) and spacecraft trajectory $r_s$ to determine line-of-sight trajectory data $l_I$ and line of sight rate $\dot{l}_I$. Means are included for determining spacecraft attitude command vector $\underline{\theta}_c$ and inertial rate command vector $\underline{\omega}_c$ utilizing $l_I$ and $\dot{l}_I$. These position and rate commands are compared with the actual attitude angle vector $\underline{\theta}$ and inertial angular rate $\underline{\omega}$ of the spacecraft for determining spacecraft attitude error $\underline{\theta}_e$ and rate error $\underline{\omega}_e$. The $\underline{\omega}_e$ is multiplied with a diagonal rate gain matrix $K_D$. The resultant $K_D \underline{\omega}_e$ is added to the $\underline{\theta}_e$ to provide a combined error e. This combined error e is integrated. The integrated combined error $e_I$ is compared with a threshold vector $A_I$. Jets of the spacecraft are turned on about an axis if the corresponding element of the $e_I$ exceeds the corresponding element of $A_I$. These steps are repeated if any element of $A_I$ exceeds the corresponding element of $e_I$. Any element of $e_I$ is zeroed whenever it exceeds the corresponding element of $A_I$, and its integration is started afresh, repeating the above steps.

Utilizing the law of Integral Frequency Modulation, the spacecraft is then controlled to track a target. As noted above, the tracking system may be used in single axis or multiple axis modes. A controller is driven by multi-axis position, rate and acceleration command profiles for tracking a moving object. The position commands involve Euler angles, and the rate and acceleration commands are inertial, expressed about the three orthogonal spacecraft axes. The following two possible scenarios are considered: (a) a zenith-facing payload, rigidly attached to the spacecraft bus, and the tracking commands using a pitch-roll sequence; (b) a nadir-facing payload and the commands based on a roll-pitch sequence. The IPFM controller of the past is modified herein to accomplish precision tracking. These modifications include:

a. Use of Inertial Measurement Unit (IMU) gyros, instead of lead network as in the past, to determine precise attitude rates and attitude of the spacecraft about each axis.

b. Use of nonzero, time-varying, multi-axis, attitude and attitude rate commands for tracking moving or flying objects.

c. Use of multi-axis track-acceleration commands to determine parameters of the IPFM controllers for each axis.

d. Use of precise attitude and rate errors, based on the modifications (a) and (b), for modulating frequency of the constant width jet pulses.

e. Use of the vectorial distance of the target image from the center of the focal plane to determine roll and pitch tracking errors.

To examine the interaction between reaction jets and flexible spacecraft, scalar metrics are devised to identify important modes from among "infinite" of them. In contrast with sophisticated analytical methods of the past, simple but intuitive criteria of stability are presented, involving the ratio of the moments of inertia of the flexible and rigid portions, $I_f/I_r$, of the spacecraft about each axis. Linear stability conditions, involving spontaneous increment in modal rate caused by thruster firing, are described below.

Other objects, advantages and novel features of the present invention will become apparent from the following detailed description of the invention when considered in conjunction with the accompanying drawings.

BRIEF DESCRIPTION OF THE DRAWINGS

FIG. 2a portrays single-axis integral pulse frequency modulation (IPFM) reaction jet controller for flexible spacecraft, wherein position and rate commands for acquiring and tracking a target are derived from the line-of-sight vector and its rate.

FIG. 2b portrays the same controller as in FIG. 2a, but it tracks a target based on tracking errors and their rates deduced from the position of the target image on the spacecraft focal plane.

FIG. 3 depicts a three-axis IPFM controller for flexible spacecraft, for multi-axis tracking of a target; the roll and pitch tracking errors and their rates are determined from the target's image on the focal plane, and yaw error from a yaw rate gyro.

FIG. 4 illustrates the computation of small roll, pitch tracking errors (i.e., attitude errors) from the location of the target image on the focal plane.

FIG. 5 portrays a two-dimensional line-of-sight motion (latitude vs. longitude) of a spacecraft for tracking a target launched from a launch site, the spacecraft being on a circular orbit.

FIG. 7 illustrates microradian roll error in tracking a target with an IPFM controller.

FIG. 8 depicts commanded and actual inertial angular rates about the body-fixed roll, pitch and yaw axes for tracking a minuteman missile, the launch trajectory of which is shown in FIG. 5.

FIG. 9 illustrates microradian/s rate errors about roll axis during a 20 s segment of missile tracking in FIG. 8.

FIG. 11 illustrates the contribution of flexibility of spacecraft solar arrays to the roll tracking error in FIG. 7, the contribution being maximum during the high tracking acceleration.

FIG. 13 depicts firings of thrusters for spacecraft pitch control during stationkeeping and afterwards and for suppression of mode 1 vibrations illustrated in FIGS. 12.

FIG. 14 demonstrates suppression of vibration of mode 4 (in-plane antisymmetric bending of solar arrays at 0.97 Hz) during time- and fuel-optimal 90° slew of a spacecraft about the roll-axis.

DETAILED DESCRIPTION OF THE PREFERRED EMBODIMENTS

I. Command Profiles for Tracking a Moving Target

A. Position Commands

Figure 1:
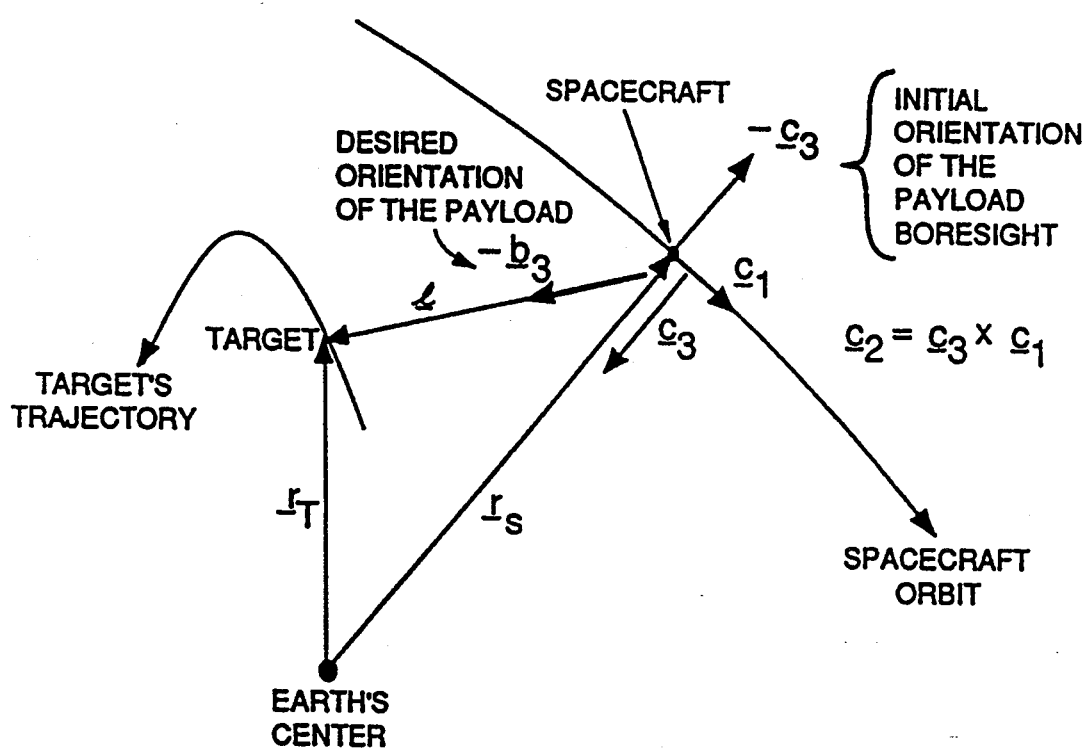
FIG. 1 depicts the geometry of the earth, spacecraft and a target, along with coordinate frames, initial orientation of the spacecraft boresight, and line-of-sight vector.

Referring to the drawings and the characters of reference marked thereon, FIG. 1 illustrates relative locations of the earth, a spacecraft in a circular orbit, and a moving target to be tracked. The spacecraft's orbit and the target's trajectory are both taken to be known. Measured from the earth's mass center, the spacecraft is at a location $r_S$ and the target at $r_T$. The ideal line-of-sight (LOS) vector $l$ is $l = -r_S + r_T$. Ideally, this vector must be along the payload boresight, which is assumed to be along the negative yaw axis ($-b_3$ unit vector, b for body). Before acquiring the target, the spacecraft-fixed triad ($b_1$, $b_2$, $b_3$) is aligned with the local-vertical-local-horizontal unit vector triad $c_1$, $c_2$, $c_3$ (shown in FIG. 1), implying that, initially, the payload boresight is along $-c_3$ (facing the zenith). Because the vectors $r_S$ and $r_T$ are known in the geocentric inertial frame, the LOS vector $l$ can be calculated, after coordinate transformations, in the orbital triad $c_1$, $c_2$, $c_3$ and expressed as $$l = l \cdot c_1 \, c_1 + l \cdot c_2 \, c_2 + l \cdot c_3 \, c_3 \tag{1}$$

in order to bring the target to the focal plane center of the payload, the spacecraft is rotated about the vector $c_2$ by an angle $\theta_{yc}$ and then about the displaced axis $c_1$ an angle $\theta_{xc}$. These angular commands can be shown to be $$\theta_{yc} = \tan^{-1}[-l \cdot c_1 / -l \cdot c_3], \quad \theta_{xc} = \sin^{-1}[l \cdot c_2 / l] \tag{2a,b}$$

where $|l| l$ | (see Hablani, H. B., "Design of a Payload Pointing Control System for Tracking Moving Objects," *J. Guidance, Control and Dynamics*, Vol. 12, No. 3, 1989, pp. 365–374). The negative signs in the numerator and the denominator in Eq. (2a) are retained so as to identify the correct quadrant of the pitch command $\theta_{yc}$; the roll command $\theta_{xc}$ will always be: $-\pi/2 \leq \theta_{xc} \leq \pi/2$. The commanded yaw angle, $\theta_{zc}$, is zero and so is its rate $\dot{\theta}_{zc}$; this does not mean, however, that the yaw (z-) component $\omega_{zc}$ of the commanded inertial rate $\underline{\omega}_c$ is zero. The expressions for $\omega_{zc}$ and the commanded roll and pitch inertial rate components ($\omega_{xc}$, $\omega_{yc}$) of $\underline{\omega}_c$ are presented below. In [Hablani, H. B., "Target Acquisition, Tracking, Spacecraft Attitude Control and Vibration Suppression with IPFM Reaction Jet Controllers," *Proceedings of the AIAA Guidance, Navigation and control Conference*, Hilton Head, S.C., August 1992, pp. 1118–1137], the position commands (2) are simplified for landmarks on the rotating earth.

B. Rate and Acceleration Commands

The inertial LOS-rate $\dot{l}$ (an overdot implies inertial differentiation) is calculated from $\dot{l} = -\dot{r}_S + \dot{r}_T$ which can be transformed readily from the geocentric inertial frame to the orbit frame $c_1$, $c_2$, $c_3$. Knowing the position command angles from the preceding, $\dot{l}$ can then be expressed in the desired orientation of the body frame $b_1$, $b_2$, $b_3$. Also, the allowable change in $l$ in the body frame is $\dot{l} = -\dot{l} b_3$ where an overcircle denotes the differentiation in a rotating frame. Following Hablani, 1987, the inertial roll and pitch rate commands, $\omega_{xc}$ and $\omega_{yc}$, respectively, are found to be $$\omega_{xc} = \underline{l} \cdot \underline{b}_2 / l \quad \omega_{yc} = -\underline{l} \cdot \underline{b}_1 / l \tag{3a,b}$$

The rate of change $\overset{\circ}{l}$ is also determined alongside: $\overset{\circ}{l} = -\underline{l} \cdot \underline{b}_3$. Next, in order to determine the yaw component $\omega_{zc}$, we recognize that, in all, the spacecraft has three desired angular rates: the clockwise rotation $-\omega_O c_2$ for earth-pointing, the pitch rate command $\theta_{yc} c_2$, and the roll rate command $\theta_{xc} b_1$; the commanded yaw angle $\theta_{zc}$ and the rate $\dot{\theta}_{zc}$ are both zero, as stated before, because they are not required for target tracking. The total inertial rate command $\underline{\omega}_c$ is therefore $$\underline{\omega}_c = [\omega_{xc} \omega_{yc} \omega_{zc}]^T = [\dot{\theta}_{xc}(\dot{\theta}_{yc} - \omega_O) c \theta_{xc} - (\dot{\theta}_{yc} - \omega_O) s \theta_{xc}]^T \tag{4}$$

the second and the third elements of which yield $$\omega_{zc} = -\omega_{yc} \tan \theta_{xc} \tag{5}$$

It is noteworthy that $\omega_{zc}$ is not a second-order quantity even when the roll angle $\theta_{xc}$ is small.

While the position and rate commands are required to determine errors for feedback, the acceleration commands are eminently useful for feedforward and/or for determining the inertial resistance the spacecraft will put forth in tracking a moving target. The derivation of these commands parallels the development in Hablani, 1987, and we arrive at $$\dot{\omega}_{xc} = (\ddot{l} \underline{b}_2 - 2 \overset{\circ}{l} \omega_{xc})/\underline{l} + \omega_{yc} \omega_{zc} \tag{6a}$$

$$\dot{\omega}_{yc} = -(\ddot{l} \underline{b}_1 + 2 \overset{\circ}{l} \omega_{yc})/\underline{l} - \omega_{xc} \omega_{zc} \tag{6b}$$

where the inertial acceleration $\ddot{l}$ of LOS 1 equals $(-\ddot{r}_S + \ddot{r}_T)$ and $\ddot{l} \cdot b_1$ and $\ddot{l} \cdot b_2$ are its roll and pitch components. The inertial yaw acceleration command $\dot{\omega}_{zc}$ is derived by differentiating Eq. (5) and recognizing that, for the pitch-roll sequence, $\omega_{xc} = \dot{\theta}_{xc}$. We then arrive at $$\dot{\omega}_{zc} = -\dot{\omega}_{yc} \tan \theta_{xc} - \omega_{xc} \omega_{yc} \sec^2 \theta_{xc} \tag{6c}$$

(Eq. (15c), Hablani, 1992, is incorrect, as it does not contain the second term in the right-hand-side of Eq. (6c) above.) From the commands (5) and (6c) we see that although the commanded yaw angle $\theta_{zc}$ equals zero, the inertial rate and acceleration commands about the z-axis are not.

While the above pointing commands are based on the pitch-roll sequence and they are for a payload initially facing the zenith, Table 1 furnishes the commands for a nadir-looking payload using a roll-pitch Euler angle sequence. The rate and acceleration commands $\omega_{zc}$ and $\dot{\omega}_{zc}$ in Table 1 are lengthy compared to their counterparts (5) and (6c) because, for the roll-pitch sequence, the orbit rate $\omega_0$ about $c_2$ cannot be expressed as simply about the pitch axis $b_2$ as for the pitch-roll sequence. Both sequences are useful nonetheless, for when one sequence is singular, the other is not.

The conditions of visibility of the target from the spacecraft are covered in detail in Hablani, 1992.

TABLE 1

| | Pointing Commands for Tracking a Moving Object: Payload Boresight Along $b_3$ and Roll-Pitch Sequence |
|---|---|
| Attitude Commands | $\theta_{xc} = \tan^{-1}(-\underline{l} \cdot \underline{c}_2)/(\underline{l} \cdot \underline{c}_3),\ \theta_{yc} = \sin^{-1}(\underline{l} \cdot \underline{c}_1/l)$ |
| Inertial | $\omega_{xc} = -\underline{l} \cdot \underline{b}_2/l,\ \omega_{yc} = \underline{l} \cdot \underline{b}_1/l$ |

TABLE 1-continued

| | Pointing Commands for Tracking a Moving Object: Payload Boresight Along $b_3$ and Roll-Pitch Sequence |
|---|---|
| Rate Commands | $\omega_{zc} = \omega_0 s \theta_{xc}/c \theta_{yc} + \omega_{xc} \tan \theta_{yc}$ |
| Inertial Accerlation | $\dot{\omega}_{xc} = -(\ddot{l} \cdot \underline{b}_2 + 2 \overset{\circ}{l} \omega_{xc})/l + \omega_{yc} \omega_{zc}$ |
| | $\dot{\omega}_{yc} = (\ddot{l} \cdot \underline{b}_1 - 2 \overset{\circ}{l} \omega_{yc})/l - \omega_{xc} \omega_{zc}$ |
| Commands | $\dot{\omega}_{zc} = \omega_0(\dot{\theta}_{xc} c \theta_{xc} c \theta_{yc} + \dot{\theta}_{yc} s \theta_{xc} s \theta_{yc}) \sec^2 \theta_{yc} + \omega_{xc} \dot{\theta}_{yc} \sec^2 \theta_{yc} + \dot{\omega}_{xc} \tan \theta_{yc}$ |
| where | $\overset{\circ}{l} = \underline{l} \cdot \underline{b}_3$ |
| | $\dot{\theta}_{xc} = (\omega_{xc} + \omega_0 s \theta_{xc} s \theta_{yc}) \sec \theta_{yc}$ |
| | $\dot{\theta}_{yc} = \omega_{yc} + \omega_0 c \theta_{xc}$ |

II. Integral Pulse Frequency Modulation (IPFM) Reaction Jet Controller

A. Single-Axis Mode of Operation

A single-axis IPFM reaction jet controller—a modified version of the one considered in (see Farrenkopf et al. above, Abdel-Rahman above, and Bernussou, Satellite Attitude Control by Reaction Jet Frequency Modulation, *Journal of Spacecraft and Rockets*, Vol. 10, No 1, 1973, pp. 52–55)—is shown in FIG. 2a. [Bernussou, above] formulates a varying integral threshold, called $A_I$ in FIG. 2a, to keep the attitude error extrema nearly the same whether external disturbances are present or not; $A_I$ is constant in this study, however. The special features of the IPFM controller in FIG. 2a are: time-varying position and rate commands $\Theta_c$ and $\dot{\Theta}_c$ (because of flexible modes, an angle based on rigid body analysis is denoted $\Theta$, while the total angle is denoted $\theta$), a rate gyro to measure the spacecraft rate $\dot{\theta}$, and a structural filter to strain out excited flexible modes from noisy gyro signal $\dot{\theta}_n$ if the axis under consideration is overly flexible. When the IPFM controller is used to slew the spacecraft or acquire a moving target, the command $\Theta_c$ and $\dot{\Theta}_c$ may be the reference trajectories developed in Redding, D.C., and Adams, N.J., "Optimized-Rotation-Axis Attitude Maneuver Controller for the Space Shuttle Orbiter," *Journal of Guidance, Control, and Dynamics*, Vol. 10, No. 1, 1987, pp. 4–13; D'Amario, L. A., and Stubbs, G. S., "A new Single-Rotation-Axis Autopilot for Rapid Spacecraft Attitude Maneuver," *Journal of Guidance and Control*, Vol. 2, No. 4, 1979, pp. 339–346, and when a target is to be tracked, the position and rate commands of Sec. 2 are used. Moreover, for attitude hold, both $\Theta_c$ and $\dot{\Theta}_c$ will be zero. An IMU gyro such as Kearfott SKIRU IV (a very precise and quiet gyro) is included in FIG. 2a instead of an attitude sensor and a lead-lag compensation (see Farrenkopf et al.; Abdel-Rahman; Millar, R. A., and Vigneron, F. R., "Attitude Stability of a Pseudorate Jet-Controlled Flexible Spacecraft," *Journal of Guidance and Control*, Vol. 2., No. 2, 1979, pp. 111–118) because precise attitude and rate measurements facilitate a smooth control of attitude as well as jitter caused by elastic modes; see Sec. 5. Very briefly, the IPFM controller functions as follows.

The spacecraft attitude $\theta$ and the rate $\dot{\theta}$ consists of rigid and elastic modes, as shown in FIG. 2a. The rigid attitude is denoted $\Theta$, and the attitude angle contributed by $\mu$-th vehicle elastic mode, $\theta_\mu$, where $\theta_\mu(t) = \Phi_\mu \eta_\mu(t)$, $\Phi_\mu$ equals the $\mu$-th rotational modal coefficient at the sensor location, and $\eta_\mu(t)$ is the $\mu$-th modal coordinate. Mathematically, $$\theta(t) = \Theta(t) + \sum_{\mu=1}^{\infty} \theta_\mu(t) = \Theta(t) + \sum_{\mu=1}^{\infty} \Phi_\mu \eta_\mu(t) \tag{7}$$

The attitude rate counterpart of Eq. (7) passes through the IMU gyro of bandwidth $\omega_g$, giving rise to a noise-free output $\dot\theta_g$ which, when blended with gyro noise $n_g$, becomes the noisy attitude rate $\dot\theta_n$. The gyro output $\dot\theta_n$ is passed through, if necessary, a structural filter, yielding thereby $\dot\theta_{nf}$, a quantity very similar but not identical to the rigid rate $\dot\Theta$. When the axis under consideration is moderately flexible, this filter is not used, and $\dot\theta_{nf}=\dot\theta_n$. Knowing the command profiles $\Theta_c$ and $\dot\Theta_c$, the position and rate errors are calculated as shown, and a composite error signal e equal to $(\theta_e + K_D\dot\theta_e)$ is formed, and its integral $e_I$ ($\dot e_I = e$) is compared with the threshold $\pm A_I$ at a desired sampling frequency. When $|e_I| \geq A_I$, the thrusters are fired for a constant pulsewidth $\tau_w (\tau_w=20$ ms, say), with the polarity of the control torque $T_c$ determined by sgn $T_c$=sgn $e_I$. As soon as the thrusters are turned on, the integral $e_I$ is reset to zero and the integration of the error signal e commences afresh (with the initial condition $e_I=0$). The integration proceeds even while the thrusters are on to ensure that, if necessary, the thrusters will be saturated; that is, for sufficiently large error signals or disturbance torques, there will be no time gap between two consecutive, minimum pulsewidth firings. The control torque $T_c$ and the disturbance torque $T_d$, when the latter is present, act on the spacecraft, producing the attitude rate $\dot\theta$, and the above operation recurs in closed-loop fashion.

FIG. 2b illustrates a single-axis IPFM controller driven by position and rate errors derived from the instantaneous off-centered position of the target image on the focal plane of the payload, instead of calculating from the position and rate commands as shown earlier in FIG. 2a. This alternate procedure, applicable to only roll and pitch axis, is beneficial in that it avoids the use of gyros during tracking and locks directly on the target, eliminating thereby drift and bias errors in attitude measurements from the gyros. It should be noted that, during tracking, attitude updates of gyro signals using stars might not be possible for, due to arbitrary attitude of the spacecraft to track a target, star sightings may not occur. Details on the derivation of roll and pitch attitude errors from the location of the target image on the payload focal plane are provided below in Multi-Axis Tracking Controller section. Inasmuch as yaw error and its rate cannot be determined likewise, the procedure shown in FIG. 2a is used perforce for yaw control.

B. Determination of Control Parameters for Rigid Spacecraft

A reaction jet controller is required to counteract disturbances such as those caused by stationkeeping or orbit-adjustment forces, producing a torque when the resultant force does not pass through the vehicle mass center. Analogously, when a spacecraft is slewed or commanded to track a target, the controller confronts inertial resistance of the spacecraft equal to the central, principle moment of inertia times the desired acceleration. The controller then must prevail against the extreme inertial resistance and slew the spacecraft or track the target within a desired tracking accuracy. With these situations in mind, below we outline the process for designing an IPFM controller, following Farrenkopf et al., given the maximum expected disturbance or resistance torque $T_d$, and also under no disturbances to act against.

1. Under a Constant Disturbance

In this circumstance, a jet controller exhibits well-known parabolic cycle behavior (see Bernussou, above). Let $\Theta_{ss}$ denote the steady state attitude offset under a disturbance torque $T_d$. To determine the integral threshold $A_I$, denote the vehicle's central principal moment of inertia about the axis under consideration as $I_\nu$, and minimum angular rate increment caused by the control torque $T_c$ as $2\dot\Theta_L$. Then, using single-axis dynamics and the equilibrium condition between the control and the disturbance torques, one can show that (see Farrenkopf et al. and Bernussou, above)

$$A_I = 2\Theta_{ss}\dot\Theta_L/\alpha_d \tag{8}$$

where $$\alpha_d = |T_d|/I_\nu 2\dot\Theta_L = |T_c| \tau_w/I_\nu \tag{9a,b}$$

The period $\tau_{Ld}$ of this limit cycle is given by $$\tau_{Ld} = 2\dot\Theta_L/\alpha_d \tag{10}$$

The rate gain $K_D$ is decided according to the desired equivalent viscous damping coefficient $\zeta_c$ of the controller, using the formula (see Farrenkopf et al.)

$$K_D = \zeta_c \sqrt{2 A_I/\dot\Theta_L} \tag{11}$$

The bandwidth frequency $\omega_{bw}$ of the equivalent proportional-plus-derivative linear controller is then given by $$\omega_{bw} = \sqrt{2}/K_D \tag{12}$$

This equivalence is valid only during a transient phase and not during the limit cycle operation, whether a disturbance torque is present or not. The limit cycle attitude $\Theta_L$ when the disturbance torque is zero is given by $$\Theta_L = A_I/(2K_D) \tag{13}$$

Accordingly, the period $\tau_L$ of the rectangular limit cycle around the origin is $$\tau_L = 4\Theta_L/\dot\Theta_L \tag{14}$$

Finally, the static saturation limits in attitude and attitude rate are $$\Theta_{sat} = A_I/\tau_w \quad \dot\Theta_{sat} = A_I/(K_D\tau_w) \tag{15}$$

reviewed in Hablani, H. B., "Target Acquisition, Tracking, Spacecraft Attitude Control, and Vibration Suppression with IPFM Reaction Jet Controllers," *Proceedings of the AIAA Guidance, Navigation and Control Conference*, Hilton Head, S.C., August, 1992, pp. 1118–1137. The steady-state attitude offset $\Theta_{ss}=A_I/\tau_{Ld}$ and the limit cycle attitude $\Theta_L=A_I/\tau_L$ are both within the saturating error limits $\pm A_I/\tau_w$ because $\tau_L > \tau_{Ld} > \tau_w$.

2. No Disturbance

In this case, the limit cycle rate $\dot{\Theta}_L$ is still calculated using Eq. (9b), but the limit cycle attitude $\Theta_L$ is now specified according to the desired performance. The limit cycle period $\tau_L$ is then determined using Eq. (14), and the rate gain $K_D$ is arrived at using $K_D = \tau_L/2$. Knowing $\Theta_L$ and $K_D$, the integral threshold $A_I$ is finally obtained from Eq. (13).

C. Multi-Axis Tracking Controller

FIG. 3 depicts a three-axis IPFM controller for flexible spacecraft for target tracking. The modifications required for multi-axis target acquisition are commented upon below. The six rigid modes associated with the vehicle translation and rotation are governed by $$m\ddot{R}_0 = F_c \quad (16a)$$

$$I\dot{\Omega}_0 = T_c \quad (16b)$$

where m=mass, and I=3×3 central inertia dyadic of the vehicle; $R_0$=3×1 rigid translation vector of the spacecraft mass center, measured from its nominal orbit and produced by the jet force $F_c$ passing through the vehicle mass center; $\Omega_0$=3×1 rigid, inertial angular velocity of the spacecraft; and $T_c$=3×1 control torque vector produced by the jets, about the spacecraft principle axes. In the rotational equation (16b), it is assumed that $\Omega_0$ is sufficiently small so that the gyric term $\Omega_0 \times I$. $\Omega_0$ is negligible compared to $I\dot{\Omega}_0$ or $T_c$. In FIG. 3, the Laplace transforms of Eqs. (16) represent the rigid dynamics of the spacecraft. The translational deviation $\underline{h}_g$ of the gyro base from a nominal circular orbit, and the measured inertial angular rate $\underline{\omega}$ of the spacecraft are obtained by augmenting $R_0$ and $\Omega_0$ with the contribution of the flexible modes:

$$\underline{h}_g = R_0 + \sum_\mu \chi_{\mu g} \eta_\mu, \quad \underline{\omega} = \Omega_0 + \sum_\mu \Phi_{\mu g} \eta_\mu \quad (17a,b)$$

where $\chi_{\mu g}$ and $\Phi_{\mu g}$ ($\mu = 1, 2, \ldots$) are, respectively, the 3×1 translational and rotational modal coefficients at the gyro base. The question of how many modes to sum in Eqs. (17) is taken up in the next section. The vehicle elastic modes are governed by $$\ddot{\eta}_\mu + 2\zeta_\mu \omega_\mu \dot{\eta}_\mu + \omega_\mu^2 \eta_\mu = \chi_{\mu J}^T F_c \quad (18)$$

where $\omega_\mu$ is the $\mu$-th modal frequency and $\zeta_\mu$ the associated modal damping coefficient; $\chi_{\mu J}$ is the $\mu$-th translational modal coefficient at the location of the jet force $F_c$.

The quantity $\underline{h}_g$, Eq. (17a), is in the spacecraft-fixed frame. In the inertial frame, it is denoted $\underline{h}_g^I$ and is obtained by using the transformation matrix $C_{ib}$: $\underline{h}_g^I = C_{ib} \underline{h}_g$. The system flexible modes do not possess momentum, and therefore the deviation of the spacecraft mass center from the nominal circular orbit is still $R_0$. However, the spacecraft navigation system registers the quantity $\underline{h}_g$, not $R_0$. But the difference between the two is negligible compared to the nominal orbit radius $r_S$, and therefore the instantaneous radius of the spacecraft orbit could be regarded as the measured quantity $r_S + \underline{h}_g^I$, as shown in FIG. 3 to determine the instantaneous line-of-sight vector $l_I$ in the inertial frame. The quantity $\underline{h}_g$ (or $R_0$) is ignored in Sec. 1, but included in FIG. 3 for precision tracking. Next, knowing the orbit inclination i and the instantaneous ascending node angle $\Omega_N$ (keeping nodal regression in mind), the line-of-sight vector $l_I$ is transformed to the local-vertical-local-horizontal circular orbit frame (FIG. 3): $l_c = C_{ci} l_I$. In order to obtain the attitude error vector $\underline{\theta}_e$, the Euler angle rates are determined first from the gyro-measured inertial angular velocity vector $\underline{\omega}$ using a pertinent inverse transformations $\underline{\dot{\theta}} = S^{-1} \underline{\omega}$, where the matrix S involves the last known attitude angles of the spacecraft. The current attitude is obtained next by integrating $\underline{\dot{\theta}}$ and knowing the previous $\underline{\theta}$. The small attitude error vector $\underline{\theta}_e$ is then: $\underline{\theta}_e = \underline{\theta}_c - \underline{\theta}$, where $\underline{\theta}_c = [\theta_{xc} \theta_{yc} 0]^T$. While this calculation of $\underline{\theta}_e$ is based on $\underline{\omega}$ measured by the gyros, a more direct (closed-form) procedure is shown in FIG. 3 instead, based on the location of the target image in the focal plane. Using the last known attitude $\underline{\theta}$ of the spacecraft relative to the local orbit frame, the line-of-sight vector $l_c$ is transformed to $l_b$ in the spacecraft-fixed frame: $l_b = C_{bc}(\underline{\theta}) l_c$. Ideally, $l_b$ should be along the payload axis, $-z_b$. But, in reality, the target image is off-centered by ($l_{xb}, l_{yb}$) in the focal plane $x_b y_b$ (see FIG. 4). Therefore, if the spacecraft is commanded to rotate by the angles $\theta_{xe}$ and $\theta_{ye}$ about the $x_b$- and $y_b$-axis (FIG. 4), respectively, where $$\theta_{xe} = l_{yb}/l \quad \theta_{ye} = -l_{xb}/l \quad (19)$$

the target image will then be centered on the focal plane. Due to the focal plane noise and quantization, however, the measured errors will be $\theta_{eQ,x}$ and $\theta_{eQ,y}$ as shown in FIG. 3.

The advantage of this alternate scheme is that it does not use gyro measurements. During tracking, it is likely that the gyro measurements cannot be updated using stars and, therefore, depending on the tracking duration, the measurements could be grossly erroneous. The yaw attitude error, nonetheless, cannot be obtained from the focal plane measurements, and so it must be deduced from the yaw rate error $\omega_{ze}$ provided by the yaw gyro, as shown in FIG. 3. Recalling the linear relationships between the inertial rate errors ($\omega_{xe}, \omega_{ye}, \omega_{ze}$) and small attitude errors ($\theta_{xe}, \theta_{ye}, \theta_{ze}$), namely, $$\omega_{xe} = \dot{\theta}_{xe} - \omega_0 \theta_{ze} \quad (20)$$

$$\omega_{ye} = \dot{\theta}_{ye} - \omega_0 \quad (21)$$

$$\omega_{ze} = \dot{\theta}_{ze} + \omega_0 \theta_{xe} \quad (22)$$

the Euler rate error $\dot{\theta}_{ze}$ is determined from $\omega_{ze}$ using Eq. (22), and then the yaw error $\theta_{ze}$ by integrating $\dot{\theta}_{ze}$ (FIG. 3). The rate errors $\omega_{xe}$ and $\omega_{ye}$, on the other hand, are obtained by substituting the quantized attitude errors $\theta_{eQ,x}$ and $\theta_{eQ,y}$ and their derivatives in Eqs. (20) and (21). Finally, having determined the position and rate errors, the control torque about each axis is determined as before in the case of the single-axis controller; for illustration, the determination of the x-axis control torque $T_{cx}$ is shown in FIG. 3.

The IPFM controller discussed above can be used for large angle, multi-axis, attitude maneuvers as well, either from a given initial state to a fixed final state, or for acquiring a moving target. For three-axis attitude maneuvers, the reference trajectories for attitude and rate for each axis can be constructed from the eigen-axis trajectory, following [D'Amario, L. A., and Stubbs, G. S., "A New Single-Rotation-Axis Autopilot for Rapid Spacecraft Attitude Maneuver," *J. Guidance and Control*, Vol. 1, No. 4, 1979, pp. 339–346], and used in lieu of the target trajectory and the line-of-sight calculations in FIG. 3. Likewise, for acquiring a moving target, the iterative algorithm of [Redding, D. C., and Adams, N. J., "Optimized-Rotation-Axis Attitude Maneuver Controller for the Space Shuttle Orbiter," *J. Guidance, Control and Dynamics*, Vol. 10, No. 1, 1987, pp. 4–13] can be employed to generate the position and rate command trajectories about the three axes.

III. Spacecraft Flexibility Considerations

The IPFM controller design procedure in Sec. II is for a rigid spacecraft, but it is intended to be used on a flexible spacecraft. Therefore, the concerns regarding mode selection, stable or unstable control-structure interaction, and avoidance of instability using a filter are addressed below.

A. Mode Selection

The attitude angle $\theta_\mu$ (t) contributed by the $\mu$-th mode and introduced in Eq. (7) is governed by (cf. Eq. 18)

$$\ddot{\theta}_\mu + 2\zeta_\mu \omega_\mu \dot{\theta}_\mu + \omega_\mu^2 \theta_\mu = \Phi_\mu \Phi_{\mu,eq} T_c(t) \quad (23)$$

where $T_c$ is the thruster's control torque about the axis under consideration, and $\Phi_{\mu,eq}$ is the equivalent $\mu$-th modal slope at the thruster location. If a vehicle mode is antisymmetric, and if the thrusters residing in the bus produce a pure couple $T_c$ at the vehicle mass center, $\Phi_{\mu,eq}$ is the modal slope $\Phi_\mu$ at the thruster location. Otherwise, $\Phi_{\mu,eq}$ is related to the translational modal coefficients at the thruster location according to Eq. (28) below. In order to select important elastic modes from a large number of them in a NASTRAN model, there are well-known metrics that quantify the importance of each mode. However, these metrics signify long term, steady-state modal response, not relevant to jet controllers. The spontaneous response of a mode is more relevant now, because that reveals immediate effects of the thruster firings. The changes in the amplitudes of the modal rate $\dot{\theta}_\mu(t)$ and the mode $\theta_\mu$, denoted $\Delta \dot{\theta}_\mu$ and $\Delta \theta_\mu$, respectively, arising from the minimum impulse bit $T_c \tau_w$, are:

$$\Delta \dot{\theta}_\mu = \Phi_\mu \Phi_{\mu,eq} T_c \tau_w, \quad \Delta \theta_\mu \Phi_{\mu,eq} T_c \tau_w / \omega_\mu \quad (24)$$

Assuming $T_c \tau_w$ to be unity, the modes can be selected on the basis of (24). Unlike the steady-state metrics in the literature, $\Delta \theta_\mu$ and $\Delta \dot{\theta}_\mu$ are independent of the damping coefficient $\zeta_\mu$, for now we focus on a quarter or one half modal period, following the impulse, and in this duration the damping has an insignificant influence on the modal response.

B. Interference of Modes in Controller Operation

Describing function and Liapunov technique apart, it seems, for a reaction jet control system to be effective on a flexible spacecraft, the changes $\Delta \dot{\theta}_\mu (\mu = 1, 2, \ldots)$ should be $$\Delta \dot{\theta}_\mu << 2 \dot{\theta}_L \quad (25)$$

The condition (25) will be satisfied if the ratio of the moment of inertia $I_f$ of the flexible parts to the moment of inertia $I_r$ of the rigid parts, both at the vehicle mass center and about the axis under consideration, is (see Hablani, H. B., 1992, above)

$$I_f/I_r << 1 \quad (26)$$

Whereas the conditions (25) and (26) consider the steady state limit cycle regime, the excessive excitation of elastic modes during transients, wherein the reaction jets are away from the limit cycling, will be avoided if the equivalent linear controller bandwidth $\omega_{bw}$, Eq. (12), is a decade smaller than a critical modal frequency $\omega_\mu$: $\omega_{bw} << \omega_\mu$.

C. Instability Due to Symmetric Elastic Modes: Linear Analysis

When the mass distribution of a spacecraft is symmetric, the attitude motion of its bus interacts with antisymmetric vehicle elastic modes only. However, for a spacecraft with two solar arrays with a z—offset, when the arrays are in the pitch-yaw (yz) plane, symmetric elastic modes—transverse bending, for instance—induce a pitch motion. As a result, any arbitrary thruster pair that produces a y-torque is not acceptable, lest it produce instability despite the colocation of the thrusters and the gyros residing in the central rigid body. The precise stability condition that applies now is stated below.

In the transient regime, a reaction jet controller is equivalent to a linear proportional-plus-derivative controller. It is well-known that this linear controller does not destabilize a vehicle flexible mode if the actuator and the sensor are colocated and if they are both of the same genre: a torque actuator paired with a gyro or an attitude sensor, and a force actuator paired with a linear displacement sensor; see Conclusion 3 of Gevarter. Otherwise, the colocation does not guarantee stability of flexible modes. Mathematically, when a rectilinear force acts on a flexible mode of a spacecraft, the mode is governed by [cf. Eqs. (18) and (23)]

$$\ddot{\theta}_\mu + 2\zeta_\mu \omega_\mu \dot{\theta}_\theta + \omega_\mu^2 \theta_\mu = \Phi_\mu \sum_j \underline{\chi}_\mu^T \underline{f}_j \quad (27)$$

where $f_j$ is the force vector produced by the j-jet, and $$\sum_j$$

extends over the thrusters fired simultaneously to produce a torque about a certain axis. The vector $f_j$ may be written in terms of the jet's direction cosine vector $a_j$, possibly different from a unit vector because of thruster canting: $f_j = a_j f$, where f is the scalar force produced by each j-jet, assuming that all jets firing simultaneously produce the same thrust f. We further assume that these jets produce a control torque $T_c$ at the vehicle mass center; then, if $l_{eq}$ denotes the equivalent moment arm, the torque $T_c$ will be given by $T_c = f l_{eq}$. Eq. (27) then transforms to $$\ddot{\theta}_\mu + 2\zeta_\mu \omega_\mu \dot{\theta}_\mu + \omega_\mu^2 \theta_\mu = \Phi_\mu \left( \sum_j \underline{\chi}_\mu^T \underline{a}_j \right) T_c / l_{eq} \quad (28)$$

The stability of the mode $\mu$, therefore, requires (see Gevarter, above) that $$\Phi_\mu \left( \sum_j \underline{\chi}_\mu^T \underline{a}_j \right) / l_{eq} > 0 \quad (29)$$

If $\chi_{\mu \oplus}$ denotes the modal translation of the point that represents the vehicle mass center, and if the thrusters and the attitude sensors both reside in the central rigid body, the condition (29) can be written as (see Hablani, H. B., 1992)

$$\Phi_\mu \chi_{\mu\oplus}^T \left( \sum_j q_j \right)/l_{eq} + \Phi_\mu^2 > 0 \qquad (30)$$

For antisymmetric modes, $\chi_{\mu\oplus}$ equals zero. Thus, when symmetric elastic modes, interact with spacecraft attitude, those jet pairs should be selected that satisfy the requirement (30) the most, for all critical elastic modes.

D. Instability Avoidance About Very Flexible Axis

When the condition (25) or (26) is violated, thruster firings cause excessive oscillations of at least one elastic mode, rendering the unfiltered rate and position errors oscillatory. With further firings in response to these errors, the oscillations grow, leading to spacecraft instability. Under these circumstances, classical double notch filters (see Blakelock, J. H., *Automatic Control of Aircraft and Missiles,* John Wiley and Sons, New York, 1991, Sec. 11.9, pp. 429–436) or generalized structural filters (see Wie, B., and Byun, K. W., "New Generalized Structural Filtering Concept for Active Vibration Control Synthesis," *J. Guidance, Control and Dynamics,* Vol. 12, No. 2, 1989, pp. 147–154) could be used with advantage. [Hablani, H. B., 1992] illustrates the benefits of using a minimum-rise-time lowpass filter (see Jess, J. and Schussler, H. W., "On the Design of Pulse Forming Networks," *IEEE Trans. on Circuit Theory,* Vol. CT-12, No. 3, 1965, pp. 393–400) for deleting a troublesome mode from the measurements; see [Hablani, H. B., 1992] for details.

IV. Numerical Results and Discussion

The control schemes discussed above are implemented on two spacecraft—one with two solar arrays with a z-offset, and the other with only one solar array. Using nonlinear digital simulations, controller performance was studied under varied circumstances but, due to space limitations, only some of the most revealing results are discussed below.

A. Multi-Axis Tracking With One-Winged Spacecraft

Figures 6A, 6B:
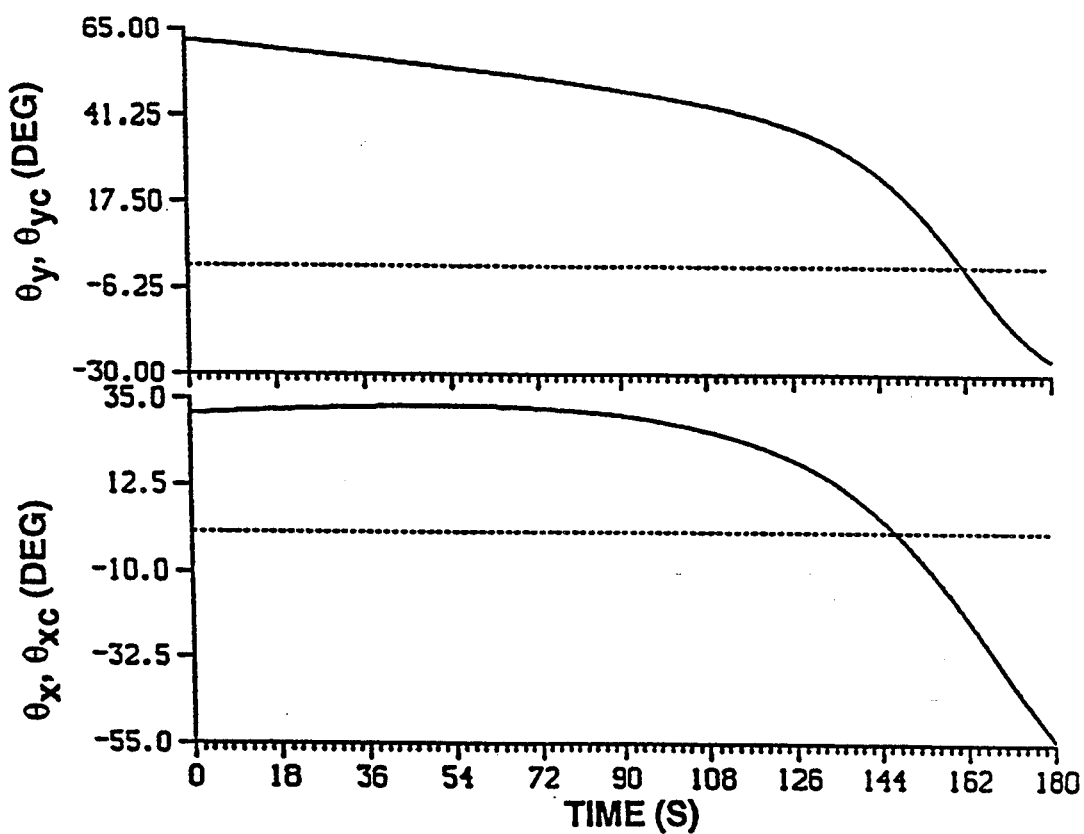
FIG. 6 compares large roll and pitch command angles with actual angles for tracking a moving target when the spacecraft is at 370 km altitude.
Figure 10A:
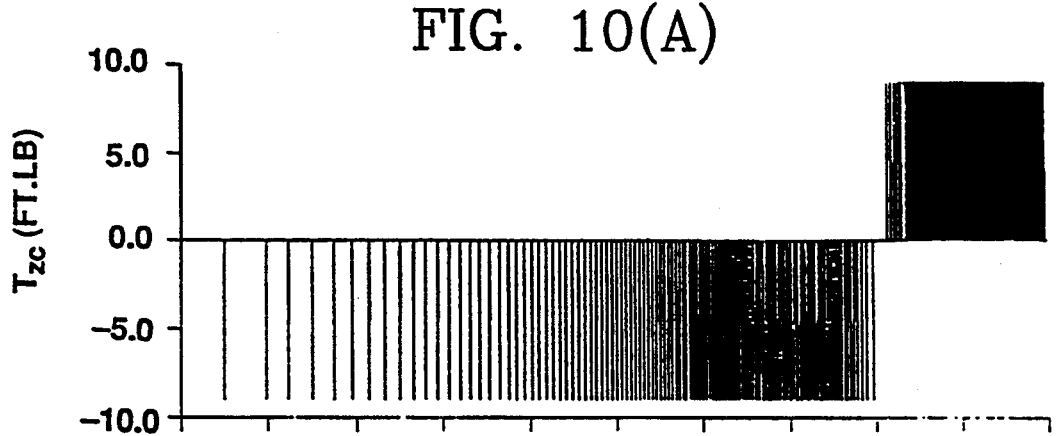
FIG. 10 shows double-sided and single-sided firing of thrusters to produce roll and yaw torques for tracking the minuteman missile in FIG. 5, double-sided firings required when spacecraft-missile line-of-sight acceleration is low, and single-sided firings required when that acceleration is high.
Figure 10B:
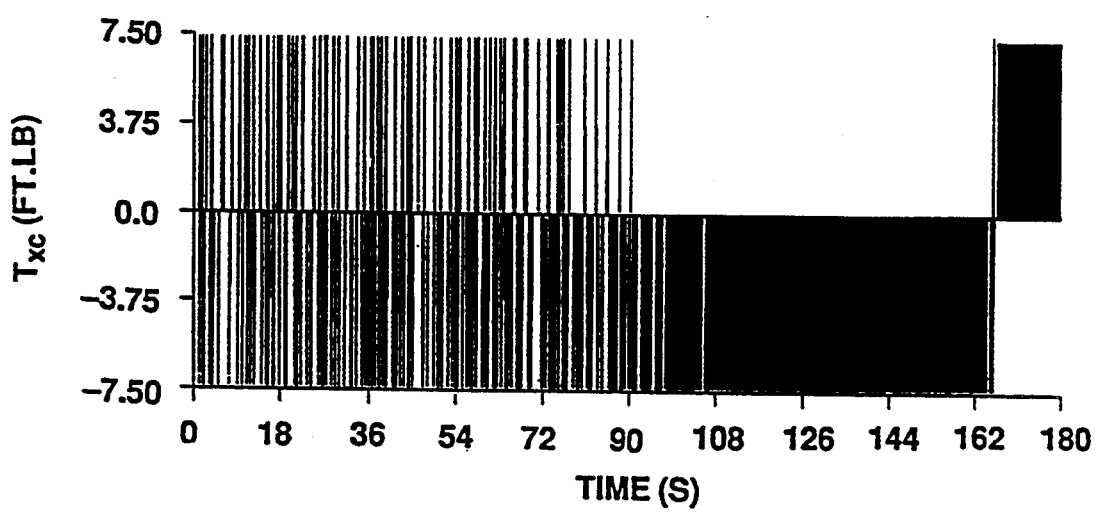

FIG. 5 illustrates segments of ground tracks of a spacecraft in a circular orbit and a target in a certain trajectory. The direction of the LOS-vector from the spacecraft to the target varies with time, as displayed by the succession of arrows in FIG. 5, with time t as a parameter. It is clear from the figure that the target is out of the spacecraft orbit plane, so both in-track (pitch, $\theta_{yc}$) and cross-track (roll, $\theta_{xc}$) commands are required for tracking. These commands are illustrated in FIG. 6, obtained by simulating the commands in Table 1 based on the roll-pitch sequence for a nadir-facing payload. The actual roll ($\theta_x$) and pitch ($\theta_y$) angles are also shown in FIG. 6, obtained by simulating the multi-axis IPFM controller shown in FIG. 3. The difference between the commanded and the actual angles, not visible in FIG. 6, is shown in FIG. 7 at a magnified scale for the roll axis. The profile of this tracking error resembles commanded inertial angular acceleration profile about the same axis because, according to Eq. (8), the steady-state offset error $\Theta_{ss}$ equals $A_1\dot{\omega}_c/(2\dot{\Theta}_L)$ where $\dot{\omega}_c$ is the commanded acceleration equivalent to $\alpha_d$. Also, the controller is deigned for the maximum $|\dot{\omega}_c|$, leading to a permissible maximum offset $\Theta_{ss}$ equal to 61.5 microrad in FIG. 7. The controller is designed to be sufficiently fast so as to track the varying acceleration command profile in all axes, and therefore the instantaneous position errors $\theta_{xe}$ and $\theta_{ye}$ are very close to the respective instantaneous offsets $\Theta_{ss}$ with slight jitter around them. Using single-axis dynamics, it can be shown that $\theta_{xe}$ varies between $\Theta_{ss}-\mu^2/(24\,\dot{\omega}_c)$ and $\Theta_{ss}+\mu^2/(12\,\dot{\omega}_c)$, and therefore the peak-to-peak amplitude of the jitter around $\Theta_{ss}$ is $\mu^2/(8\,\dot{\omega}_c)$, inversely proportional to the commanded acceleration. This trend is observed in FIG. 7 where jitter amplitude is small in the high acceleration regime after t=100 s. In the low acceleration regime, the jitter amplitude is not governed by the above relationship; it then becomes equal to the peak-to-peak limit cycle amplitude $2\Theta_L$, observed in FIG. 7 in the low acceleration regime before t=100 s. The rate commands about the three axes and the actual rates are shown in FIG. 8. The spacecraft rate at t=0 is set to be equal to the commanded rate, and therefore transients do not arise near t=0 in FIG. 8. Furthermore, we observe that, while the commanded rates $\omega_{xc}$ and $\omega_{yc}$ are tracked very closely, the rate $\omega_{zc}$ is not, particularly in the high acceleration regime; this is of course intentional, as the yaw-axis controller need not be as tight as the roll and pitch controllers. The rate error $\omega_{xe}$ is shown at magnified scales in FIG. 9 for $160 \leq t \leq 180$ s, the duration in which the associated rate commands and the rate errors are the largest. The peak-to-peak jitter amplitude of the rate error is typically equal to $2\dot{\Theta}_L$, equal to 32 microrad/s. Finally, FIG. 10 illustrates the control torque history about the roll and yaw axes, that about the pitch axis being the same as the one about the roll axis. We observe in this figure that, when the roll and pitch track accelerations are much smaller than the control acceleration, the double-sided firings occur. Gradually, as the high track acceleration regime is approached, the onesided firings take over.

The position error $\theta_{xe}$ shown earlier in FIG. 7 is made up of both rigid and flexible modes. The solar array at the time of tracking is tilted about the roll-axis and situated on the +y-side of the spacecraft. Its transverse bending (0.47 Hz, fundamental mode) induces roll motion, and the torsion and in-plane bending modes (1.38 and 1.77 Hz, fundamental modes) induce, respectively, pitch and yaw motion. The incremental attitude rates, Eq. (24a), corresponding to these three fundamental modes, produced by the given minimum impulse bit of the thrusters, are $$\Delta\dot{\theta}_X = 6.8\ \mu\text{rad/s} \quad \Delta\dot{\theta}_y = 0.52\ \mu\text{rad/s} \quad \Delta\dot{\theta}_Z = 55.7\ \mu\text{rad/s}$$

whereas the rigid limit cycle rates $\dot{\Theta}_L$ for the given vehicle moment of inertia about each axis are $$\dot{\Theta}_{L,x} = 16.25\ \mu\text{rad/s} \quad \dot{\Theta}_{L,y} = 16.25\ \mu\text{rad/s} \quad \dot{\Theta}_{L,z} = 40.7\ \mu\text{rad/s}$$

Clearly, the stability criterion (25) is satisfied for x- and y-axis with considerable margin, and for z-axis with little margin. For this reason and also because the yaw pointing accuracy is not critical for tracking, the z-IPFM controller is not designed to be tight as the x- and y-controller, as stated before. The most eventful, still benign, control-structure interaction is seen in the roll-axis in FIG. 11, displaying the contribution $\theta_{xf}$ of ten flexible modes to the roll angle. The modal damping coefficient $\zeta_\mu(\mu=1,2,\ldots)$ is taken to be 0.0025 in the simulation. Most of $\theta_{xf}$ arises from the fundamental transverse bending mode (0.47 Hz). It is observed in FIG. 11 that, because the track acceleration rises at a rate much slower than 2.13 s period of this mode, the solar array bends quasistatically, with a maximum contribution of nearly 50 μrad to the roll angle.

B. Attitude Control During Stationkeeping: Spacecraft With Two Solar Arrays

Consider now a spacecraft with solar arrays on the +y- and −y-side, their planes in the pitch-yaw (yz) plane, and the arrays hinged to the central bus with equal −z-offsets (the arrays located on the zenith side). Because of this orientation, the fundamental symmetric elastic mode (a system mode, frequency 0.28 Hz) induces pitch motion (see Table 2). To ensure a proper selection of the thrusters for y-control, the left-hand-side quantity of the stability inequality (30) is calculated for different pairs of thrusters (Table 3) for both +y- and −y-torque, considering only the most dominating mode—mode 1. It is evident from Table 3 that the pairs (1,4) and (5,8) violate the condition (30) and therefore a controller using them will be unstable. Precisely this is inferred from the two encirclements of the critical point in the Nichols plots (not included here, for brevity) of a linear proportional-plus-derivative controller equivalent to the IFPM controller using the pairs (1,4) and (5,8). The equivalent proportional and derivative gains are $K_{p,eq}=I_y \omega_{bw}^2$, $K_{d,eq}=2 \zeta_c \omega_{bw}^2 I_y$. Comparing the modal gains of the remaining pairs in Table 3, the pairs (6,7) and (2,3) are obviously the most stable. This is substantiated by the corresponding stable Nichols plot wherein we also observe that the gain/phase curve corresponding to the rigid spacecraft are stable regardless of the thruster pairs. These results were further confirmed by a time-domain simulation of the nonlinear IPFM controller for y-axis.

TABLE 2

IPFM Controller and Modal Parameters for the Generic Flexible Spacecraft

| Axis | Fundamental Interacting Vehicle Mode | Modal Freq. (Hz) | $I_f/I_r$ | $\Delta\dot\theta_\mu/2\Theta_L$ | Equiv. Linear Controller Freq. (Hz) | $\Theta_L$ (rad) | Limit Cycle Period $\tau_L$ (s) | Limit Cycle Period with Disturbance $\tau_{Ld}^{(s)}$ |
|---|---|---|---|---|---|---|---|---|
| x (roll) | In-Plane Anti-symmetric Bending | 0.97 | 0.47 | 0.39 | 0.167 | 0.0324E-3 | 2.69 | 0.025 |
| y (pitch) | Symmetric Transverse Bending | 0.28 | 0.064 | 0.0636 | 0.18 | 0.04286E-3 | 2.52 | 0.025 |
| z (yaw) | Antisymmetric Transverse Bending | 0.40 | 1.7 | 1.166 | 0.009 | 28.4E-6 | 50.5 | 0.328 |

TABLE 3

The Modal Gain for y-Thrusters and Stability Characteristics

| +y Torque Pair | −y Torque Pair | Symmetric Transverse Bending Mode 1 Gain | Stability Property |
|---|---|---|---|
| 6,7 | 2,3 | 0.182 | Stable |
| 1,4 | 5,8 | −0.116 | Unstable |
| 1,6 | 2,5 | 0.033 | Marginally stable |

Figures 12A, 12B, 12C:
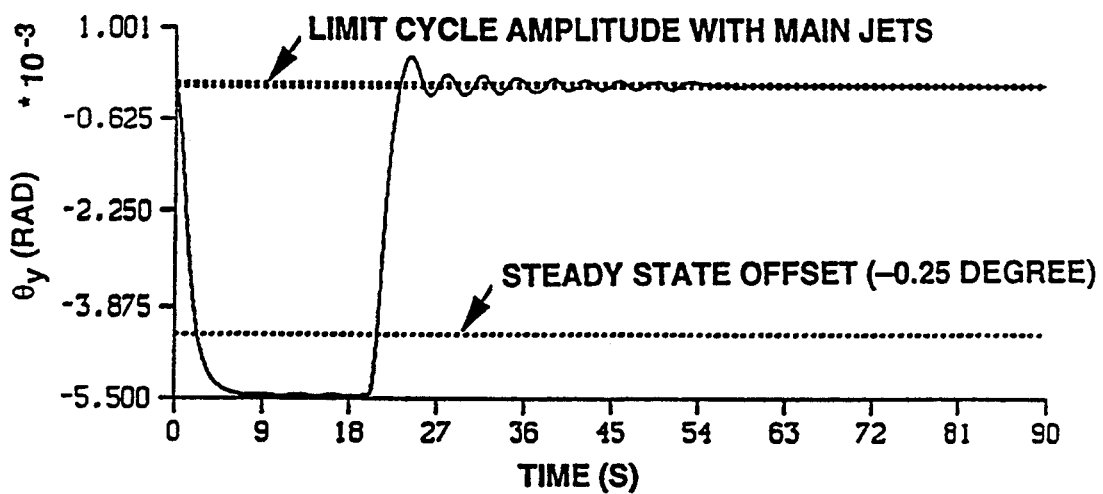
FIG. 12a illustrates the smooth spacecraft control about pitch axis during and after 20 s of velocity correction firing in the presence of engine misalignment.
FIGS. 12b and 12c illustrate suppression of vibrations of mode 1 (transverse symmetric bending of solar arrays at 0.28 Hz) contributing to the spacecraft pitch angle due to a moment arm; suppression to milliradians using main jets and microradians using vernier jets.

Using a single-axis flexible model, FIGS. 12 through 14 illustrate the performance of the y-controller during 20 s of stationkeeping disturbances and afterwards. During stationkeeping (t≦20 s), the pitch attitude (FIG. 12a) rises to the specified steady state offset (actually, to a value slightly greater, because of 50 Hz sampling frequency instead of a higher one). when the stationkeeping thrust is turned off at t=20 s, the pitch attitude $\theta_y$ is gently brought to its natural limit cycle, amid some oscillations cause by the mode 1. The IPFM controller, however, suppresses these oscillations as well, linearly as shown at a magnified scale in FIG. 12b for main jets, active until t=52 s, and at a still more magnified scale in FIG. 12c for vernier jets active afterwards. Beyond t≈75 s, the angle $\theta_y$ is essentially a rigid angle, exhibiting a limit cycle behavior. FIG. 13 portrays the control torque exerted first by the main jets and then, after t=52 s, by vernier jets. In this example, the IPFM controller suppresses the mode 1 successfully because, as shown in Table 2, $I_f/I_r \approx \Delta\dot\theta_\mu/2\Theta_L \approx 0.064 < <1$ for the y-axis.

The above smooth performance of the IPFM controller contrasts sharply with the jerky behavior of the PWPF (pulse-width-pulse-frequency) controller in FIG. 8, Ref. 4 under similar circumstances. The undesirable features of the latter controller are: significant oscillations of the position error around $\Theta_{SS}$ under a constant disturbance, and the limit cycle amplitude $2\Theta_L$ as much as $\Theta_{SS}$. These features arise because the PWPF torque command, unlike the IPFM command, is governed by the instantaneous position and rate errors, not by their integrals.

The performance of the x-IPFM controller is similar to that of the y-controller. The ratios $I_f/I_r$ and $\Delta\dot\theta_\mu/2\Theta_L$ satisfy the inequalities (25) and (26) (see Table 2) and therefore the fundamental antisymmetric in-plane bending modes, inducing roll, is suppressed by the controller. This is exhibited in FIG. 14, displaying the contribution of the mode 4 (0.97 Hz) to the roll motion during a 90° slew preceeding the stationkeeping. In order to execute the slew motion, the fuel/time optimal reference trajectories in attitude and attitude rate are used as command profiles. The smooth slewing performance (as an acquisition problem) is discussed and illustrated in detail in Ref. 8. To understand the vibration suppression during slew (FIG. 14) recall that in an open-loop system, the first acceleration pulse excites the elastic modes to twice the static deformation. But here we observe that the IPFM controller stunts the oscillation from the beginning and suppresses it quickly to its static deformation level (it cannot be suppressed any further, with the thrusters residing in the spacecraft bus) and to very small rates. During coasting, thrusters are not fired, so the corresponding static deformation is zero and the jets now suppress the earlier static deformation to nearly zero amplitude. (Actual magnitudes of the elastic contributions in FIG. 14 are not important.) During deceleration phase and subsequently, the controller re-displays its vibration suppression ability. We must point out that the coasting phase in the slew process not only reduces fuel consumption, it presents as well to the controller a time interval to suppress the rigid offset error in the slew angle of the spacecraft (such as 0.25 deg in FIG. 12a) and the positive static deformation $\theta_{xf}$ in FIG. 14; otherwise, the immediately following deceleration pulse will suddenly impose opposite rigid offset error and static deformation, accentuating the prior errors and usually destabilizing the spacecraft.

As for the yaw axis, Table 2 shows that the inequalities (25) and (26) are both violated, and therefore an instability owing to the mode 4 (0.4 Hz) is likely. The z-IPFM controller, designed by ignoring the flexibility, is indeed found to be unstable through a time-domain simulation of flexible z-axis. In the frequency-domain, this instability is foreshadowed in the Bode plot of an equivalent linear controller, but not apprehended, by indicating a gain of 15 dB at the modal frequency of 0.4 Hz. This instability is eliminated by inserting a minimum-rise-time lowpass filter, resulting in a controller that not only controls the spacecraft about the z-axis during slews and stationkeeping, but suppresses the mode 2 as well, albeit only slightly. The corresponding time-domain and the frequency-domain results are displayed and discussed in Hablani, H. B., 1992.

Obviously, other modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A tracking system for tracking a target with a spacecraft, comprising:

at least one integral pulse frequency modulation reaction jet control system for tracking the target with small tracking errors, said at least one reaction jet control system comprising:

a) means for utilizing target trajectory data ($r_T$) and spacecraft trajectory data ($r_S$) to determine line of sight trajectory data $l_f$ and line of sight rate $\dot{l}_f$;

b) means for determining spacecraft attitude command ($\underline{\Theta}_C$) and rate command ($\underline{\omega}_C$) utilizing said $l_f$ and said $\dot{l}_f$;

c) means for utilizing said ($\underline{\Theta}_C$) and ($\underline{\omega}_C$) in conjunction with actual attitude signals ($\Theta$) and rate signals ($\underline{\omega}$) of said spacecraft for determining spacecraft attitude error ($\underline{\Theta}_e$) and error ($\underline{\omega}_e$);

d) means for multiplying said $\underline{\omega}_e$ with a diagonal rate gain matrix ($K_D$), and adding the resultant value, $K_D \underline{\omega}_e$, to said $\underline{\Theta}_e$ to provide a combined error e;

e) means for integrating said e and comparing the integrated combined error ($e_I$) with a threshold vector ($A_I$), jets of said spacecraft being turned on about an axis if the corresponding element of said ($e_I$) exceeds the corresponding element of said $A_I$, said previous steps being repeated if any element of said $A_I$ exceeds the corresponding element of said $e_I$; and f) means for zeroing any element of $e_I$ whenever it exceeds the corresponding element of $A_I$ and starting its integration afresh, repeating the above steps.

2. The tracking system of claim 1, wherein said means for utilizing said $\underline{\Theta}_C$, $\underline{\omega}_C$, $\underline{\theta}$ and $\underline{\omega}$ for determining $\theta_e$ and $\underline{\omega}_e$, comprises:

rate gyros about roll, pitch and yaw axes of said spacecraft for determining $\underline{\omega}$ and $\underline{\theta}$.

3. The tracking system of claim 1, wherein said means for utilizing said $\underline{\theta}_c$, $\underline{\omega}_c$, $\underline{\theta}$ and $\underline{\omega}$ for determining $\theta_e$ and $\underline{\omega}_e$, comprises:

a rate gyro about a yaw axis of said spacecraft to determine spacecraft yaw rate ($\omega_z$) and, means for determining an instantaneous location of a target image on a spacecraft focal plane, from which roll and pitch position errors, $\theta_{xe}$ and $\theta_{ye}$, are determined by the equations:

$$\theta_{xe} = l_{yb}/l \quad \theta_{ye} = -l_{xb}/l \quad (1)$$

where ($l_{xb}$, $l_{yb}$) locate the target image on the spacecraft focal plane and l is the distance from the spacecraft to the target.

4. The tracking system of claim 1, further including means for determining said $A_I$ and said $K_D$, comprising:

means for utilizing said $l_f$ and its derivatives $\dot{l}_f$ and $\ddot{l}_f$ for determining angular acceleration commands ($\underline{\dot{\omega}}_c$) and using said $\underline{\dot{\omega}}_c$ to determine the threshold vector $A_I$ and the diagonal matrix $K_D$.

5. The tracking system of claim 4, wherein said $\underline{\dot{\omega}}_c$, comprises $\dot{\omega}_{xc}$, $\dot{\omega}_{yc}$ and $\dot{\omega}_{zc}$ defined as follows:

$$\dot{\omega}_{xc} = (\ddot{l}\underline{b}_2 - 2\dot{l}\omega_{xc})/l + \omega_{yc}\omega_{zc} \quad (1)$$

$$\dot{\omega}_{yc} = -(\ddot{l}\underline{b}_1 + 2\dot{l}\omega_{yc})/l - \omega_{xc}\omega_{zc} \quad (2)$$

$$\dot{\omega}_{zc} = -\dot{\omega}_{yc} \tan\theta_{xc} - \omega_{xc}\omega_{yc} \sec^2\theta_{xc} \quad (3)$$

where $\ddot{l}.b_1$ and $\ddot{l}.b_2$ are the components of the line-of-sight acceleration ($\ddot{l}$) along the spacecraft roll and pitch axes, respectively; $\dot{l}$ is the rate of change of the line-of-sight l along the negative yaw axis (the sensor boresight), said control parameters $A_I$ and $K_D$ being determined for each axis as follows:

x-axis:
$$A_I = 2\,\theta_{ss}\dot{\theta}_L/|\dot{\omega}_{xc,max}|$$

$$K_D = \zeta_c \sqrt{2 A_I/\dot{\theta}_L}$$

where $\theta_{ss}$ is the acceptable steady-state pointing error, 2 $\dot{\theta}_L$ is the angular rate increment caused by minimum impulse bit of the thrusters, $\dot{\omega}_{xc,max}$ is the maximum commanded angular acceleration about the x-axis, and $\zeta_c = 0.707$ is the damping coefficient of an equivalent linear controller, $A_I$ and $K_D$ being similarly defined for the y-axis and z-axis.

6. A tracking system for tracking a target with a spacecraft, comprising:

at least one integral pulse frequency modulation reaction jet control system for tracking the target with small tracking errors, said at least one reaction jet control system, comprising a single reaction jet control system for single-axis slew, said single reaction jet control system, comprising:

a) means for determining instantaneous time-and-fuel-optimal position command ($\Theta_c$) and rate command $\omega_c$ about a slew axis;

b) means for utilizing said $\Theta_c$ and $\omega_c$ in conjunction with an actual attitude signal ($\Theta$) and rate signal ($\omega$) of said spacecraft about the axis under consideration, for determining attitude error $\Theta_e$ and rate error $\omega_e$;

c) means for multiplying said $\omega_e$ with a rate gain $K_D$, and adding the resulting value $K_D \omega_e$ to said $\Theta_e$ to provide a combined error e;

d) means for integrating said e and comparing the integrated combined error $e_I$ with a threshold $A_I$, jets of said spacecraft being turned on about the slew axis if $A_I$ exceeds $|e_I|$, the sign of the torque being the same as the sign of $e_I$, said previous steps being repeated if $A_I$ exceeds $|e_I|$; and e) means for zeroing $e_I$ when $|e_I|$ exceeds the threshold $A_I$ and starting its integration afresh, repeating the above steps, said $\Theta_c$ and $\omega_c$ about the other two axes of the spacecraft being zeroed.

7. The single-axis reaction jet control system for single-axis slew as defined in claim 6, wherein said control parameters $A_I$ and $K_D$ are determined as follows:

$$A_I = 2\,\theta_{SS}\dot{\theta}_L/|\dot{\omega}_{slew,max}|$$

$$K_D = \zeta_c \sqrt{2\,A_I/\dot{\theta}_L}$$

where $\theta_{ss}$ is the acceptable steady-state difference between commanded slew angle ($\theta_c$) and actual slew angle $\theta$, $2\,\dot{\theta}_L$ is the angular rate increment caused by minimum impulse bit of the thrusters, $\dot{\omega}_{slew,max}$ is the maximum commanded slew acceleration, and $\zeta_c = 1/\sqrt{2}$ is the damping coefficient of an equivalent linear controller.

8. A tracking system for tracking a target with a spacecraft, comprising:

at least one integral pulse frequency modulation reaction jet control system for tracking the target with small tracking errors, wherein said spacecraft has a flexible portion, said spacecraft being modeled by quantifying the importance of each vehicle elastic mode by the following criteria:

$$\Delta\dot{\Theta}_\mu = \Phi_\mu \Phi_{\mu,eq} T_c \tau_w \quad (1)$$

$$\Delta\Theta_\mu = \Phi_\mu \Phi_{\mu,eq} T_c \tau_w / \omega_\mu \quad (2)$$

wherein $\Delta\Theta_\mu$ is the spontaneous attitude response and $\Delta\dot{\Theta}_\mu$ is the attitude rate response arising from $\mu$-th vehicle elastic mode excited by the minimum impulse $T_c\tau_w$ of the thrusters, and wherein $T_c$ = control torque produced by the thrusters
$\tau_w$ = minimum pulse width of the thrusters $\Phi_\mu$ = the slope of the mode $\mu$ contributing to the spacecraft attitude $\Theta$ as measured by a gyro $$\phi_{\mu,eq} = \sum_j \chi_{\mu j}^T a_j / l_{eq}$$

= equivalent modal slope at the thruster locations
$\chi_{\mu j}$ = $\mu$-th translational modal coefficient at the j-th thruster location
$\omega_\mu$ = frequency of $\mu$-th mode
$a_j$ = unit vector along the force of the j-th thruster
$l_{eq}$ = equivalent moment arm corresponding to all thrusters firing simultaneously to produce the torque $T_c = f l_{eq}$
$f_j$ = force vector produced by j-th thruster, $f_j = a_j f$
$f = |f_j|$ $$\sum_j$$

= summation over all j-th thrusters firing simultaneously to produce the torque $T_c$, j critical modes being selected based on dominant $\Delta\Theta_\mu$.

9. The tracking system of claim 8, wherein stability conditions are determined by the following criteria:

Condition 1: $\Delta\dot{\theta}_\mu << 2\dot{\theta}_L$, or equivalently

Condition 2: $I_f/I_r << 1$, the first condition being applied to the most critical mode, based on said dominant $\Delta\dot{\theta}_\mu$, $I_f$ and $I_r$ = moments of inertia, respectively, of flexible and rigid portions of the spacecraft at the vehicle mass center and about the principle axis under consideration.

10. The tracking system of claim 8, wherein the locations of the spacecraft thrusters are determined by the following stability criterion:

$$\Phi_\mu \Phi_{\mu,eq} > 0,$$

the control system being unstable if this criterion is not satisfied.

* * * * *